United States Patent
Wang et al.

(10) Patent No.: US 12,256,461 B2
(45) Date of Patent: *Mar. 18, 2025

(54) PROCEDURE AND SIGNALING FOR SIDELINK DRX ALIGNMENT

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,446

(22) Filed: Oct. 27, 2023

(65) Prior Publication Data

US 2024/0064860 A1    Feb. 22, 2024

Related U.S. Application Data

(63) Continuation of application No. 17/526,996, filed on Nov. 15, 2021.

(51) Int. Cl.
*H04W 76/28* (2018.01)
*H04W 68/00* (2009.01)
(Continued)

(52) U.S. Cl.
CPC ......... *H04W 76/28* (2018.02); *H04W 68/005* (2013.01); *H04W 92/10* (2013.01); *H04W 92/20* (2013.01)

(58) Field of Classification Search
None
See application file for complete search history.

(56) References Cited

U.S. PATENT DOCUMENTS 12,082,158 B2 *   9/2024   Ye .................... H04W 52/0235
2007/0286080 A1  12/2007   Kim et al.
(Continued)

FOREIGN PATENT DOCUMENTS

DE   102021118717 A1   1/2022
WO      2018064477 A1   4/2018
(Continued)

*Primary Examiner* — Jamaal Henson
(74) *Attorney, Agent, or Firm* — Dinsmore & Shohl LLP

(57) ABSTRACT

Certain aspects of the present disclosure provide techniques for air interface and sidelink discontinuous reception alignment for inactive/idle user equipment. A method performed by a user equipment (UE) includes receiving, from a second user equipment at a first user equipment over a sidelink interface, discontinuous reception (DRX) configuration assistance information and transmitting, from the first user equipment to a network via an air interface, the DRX configuration assistance information. The method may further include receiving, from the network at the first user equipment via the air interface: modified air interface DRX configuration information for the first user equipment, and sidelink DRX configuration information for the first user equipment and the second user equipment, wherein the sidelink DRX configuration information is based on the DRX configuration assistance information; and transmitting, from the first user equipment to the second user equipment over the sidelink interface, the sidelink DRX configuration information.

20 Claims, 16 Drawing Sheets

(51) Int. Cl.
    *H04W 92/10*      (2009.01)
    *H04W 92/20*      (2009.01)

(56)            References Cited

U.S. PATENT DOCUMENTS

2008/0101268 A1    5/2008   Sammour et al.
2011/0268004 A1   11/2011   Doppler et al.
2019/0090198 A1    3/2019   Zhao
2019/0110273 A1    4/2019   Jiang et al.
2019/0116626 A1    4/2019   Zhao
2019/0174411 A1    6/2019   Xu et al.
2021/0227620 A1    7/2021   Pan et al.
2021/0227621 A1*   7/2021   Pan .................... H04W 72/02
2021/0321329 A1   10/2021   Tenny et al.
2021/0400762 A1*  12/2021   Jeong .................. H04W 24/10
2022/0183101 A1*   6/2022   Jang ................... H04L 5/0078
2023/0014303 A1    1/2023   Di Girolamo et al.
2023/0059876 A1    2/2023   Pan et al.
2023/0062804 A1    3/2023   Selvanesan et al.
2023/0064488 A1*   3/2023   Han .................... H04W 76/28
2023/0156853 A1    5/2023   Wang et al.
2023/0199909 A1    6/2023   Mohammad et al.
2024/0173118 A1*   5/2024   Grossman ............... A61F 2/966
2024/0237139 A1*   7/2024   Jeong .................. H04W 24/10
2024/0292485 A1*   8/2024   Yang ................... H04W 72/25

FOREIGN PATENT DOCUMENTS

WO        2021147011 A1       7/2021
WO        2021206952 A1      10/2021
WO        2023019234 A1       2/2023

\* cited by examiner

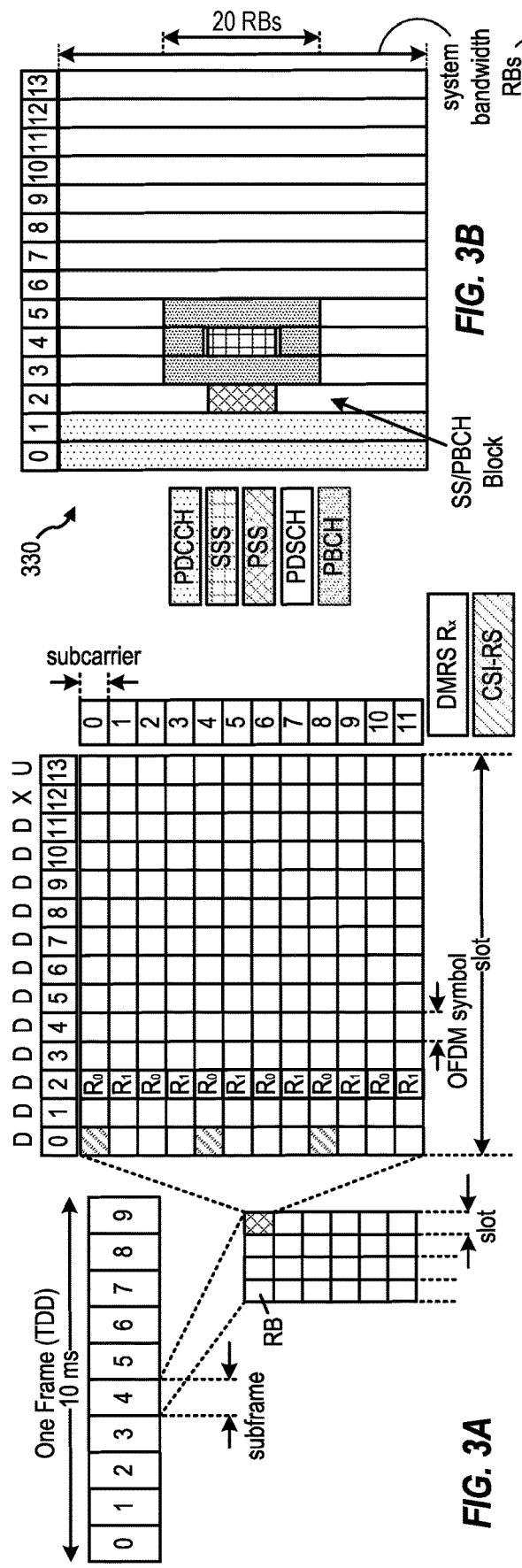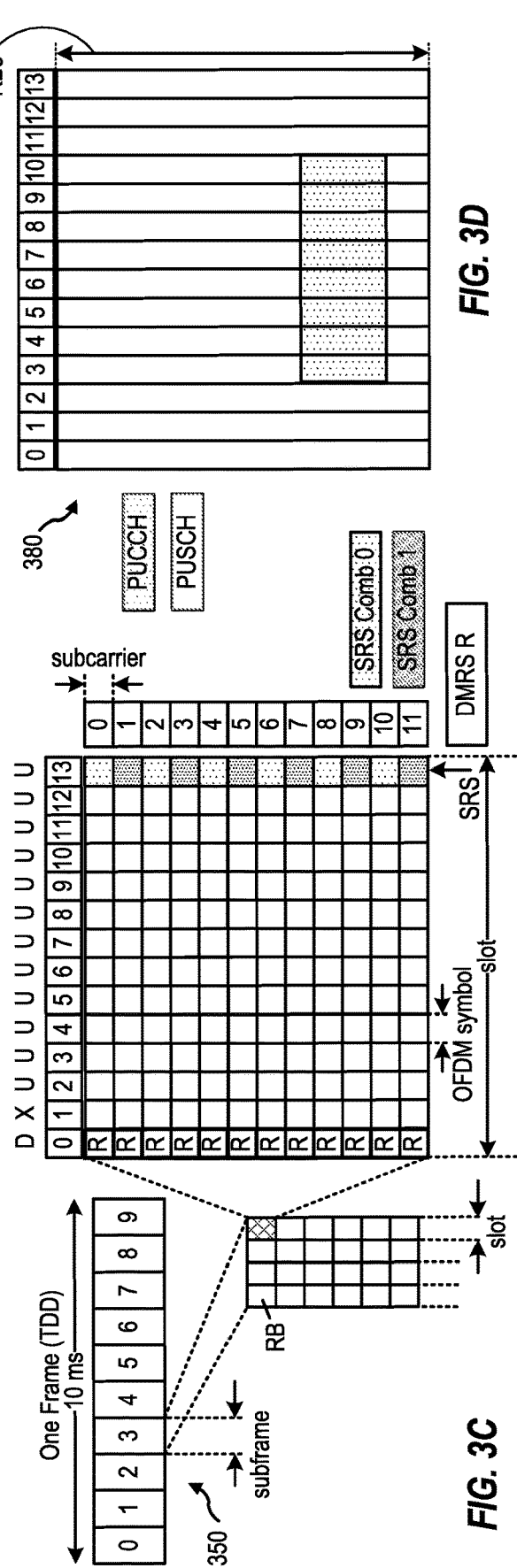

PROCEDURE AND SIGNALING FOR SIDELINK DRX ALIGNMENT

CROSS-REFERENCE TO RELATED APPLICATION

This application is a continuation of and claims priority to U.S. patent application Ser. No. 17/526,996 filed Nov. 15, 2021, which is incorporated herein by reference in its entirety.

INTRODUCTION

Aspects of the present disclosure relate to wireless communications, and more particularly, to techniques for sidelink discontinuous reception (DRX) alignment.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), comprising: receiving, from a network at a first user equipment over an air interface, discontinuous reception (DRX) configuration assistance information; transmitting, from the first user equipment to a second user equipment via a sidelink interface, the DRX configuration assistance information; receiving, from the second user equipment at the first user equipment via the sidelink interface, sidelink DRX configuration information, wherein the sidelink DRX configuration information is based on the DRX configuration assistance information; transmitting, from the first user equipment to the network over the air interface, the sidelink DRX configuration information; and receiving, from the network at the first user equipment, modified air interface DRX configuration information for the first user equipment.

Another aspect provides a method for wireless communication by a base station (BS), comprising: transmitting, to a first user equipment over an air interface, discontinuous reception (DRX) configuration assistance information; receiving, from the first user equipment over the air interface, a sidelink DRX configuration information; and transmitting, to the first user equipment, modified air interface DRX configuration information for the first user equipment.

Another aspect provides a method for wireless communication by a user equipment (UE), comprising: receiving, from a second user equipment at a first user equipment over a sidelink interface, discontinuous reception (DRX) configuration assistance information; transmitting, from the first user equipment to a network via an air interface, the DRX configuration assistance information; receiving, from the network at the first user equipment via the air interface: modified air interface DRX configuration information for the first user equipment; sidelink DRX configuration information for the first user equipment and the second user equipment, wherein the sidelink DRX configuration information is based on the DRX configuration assistance information; and transmitting, from the first user equipment to the second user equipment over the sidelink interface, the sidelink DRX configuration information.

Another aspect provides a method for wireless communication by a base station (BS) comprising: receiving, from the first user equipment to a network via an air interface, DRX configuration assistance information; and transmitting, from the network at the first user equipment via the air interface: modified air interface DRX configuration information for the first user equipment; and sidelink DRX configuration information for the first user equipment and a second user equipment, wherein the sidelink DRX configuration information is based on the DRX configuration assistance information.

Another aspect provides a method for wireless communication by a user equipment (UE), comprising: transmitting, from a first user equipment to a second user equipment via a sidelink interface, discontinuous reception (DRX) configuration assistance information; and receiving, from the second user equipment at the first user equipment via the sidelink interface, sidelink DRX configuration information, wherein the sidelink DRX configuration information is based on the DRX configuration assistance information.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for sidelink discontinuous reception alignment.

Discontinuous reception (DRX) generally enables user equipments (UEs) to reduce power use by scheduling "on" and "off" (or "awake" and "sleep") periods for transmitting and receiving (transceiving) hardware. Coordinating DRX periods is generally performed by a serving network such that the network knows when to send transmissions to a user equipment, and a user equipment knows when to "wake up" to receive such transmissions.

User equipments may also be configured to communicate amongst themselves without network involvement, such as using sidelink communication protocols. And similar to communications between a user equipment and a network, communications between user equipments using sidelink communications protocols may leverage DRX.

Having separate DRX cycles for network communications (e.g., air interface or network DRX configurations) and for sidelink communications (e.g., sidelink DRX configurations) may lead to misalignment of active periods for user equipments participating in network and sidelink communications. Consequently, aligning active periods (e.g., where a user equipment enables transceiving hardware) between air interface DRX cycles and sidelink DRX cycles may lead to reduced transmission latency, further reduced power consumption, and improved user experience. Additionally, such alignment beneficially enables more-efficient use of time and frequency resources within the wireless network and improves overall data throughput within the network.

Introduction to Wireless Communication Networks

Figure 1:
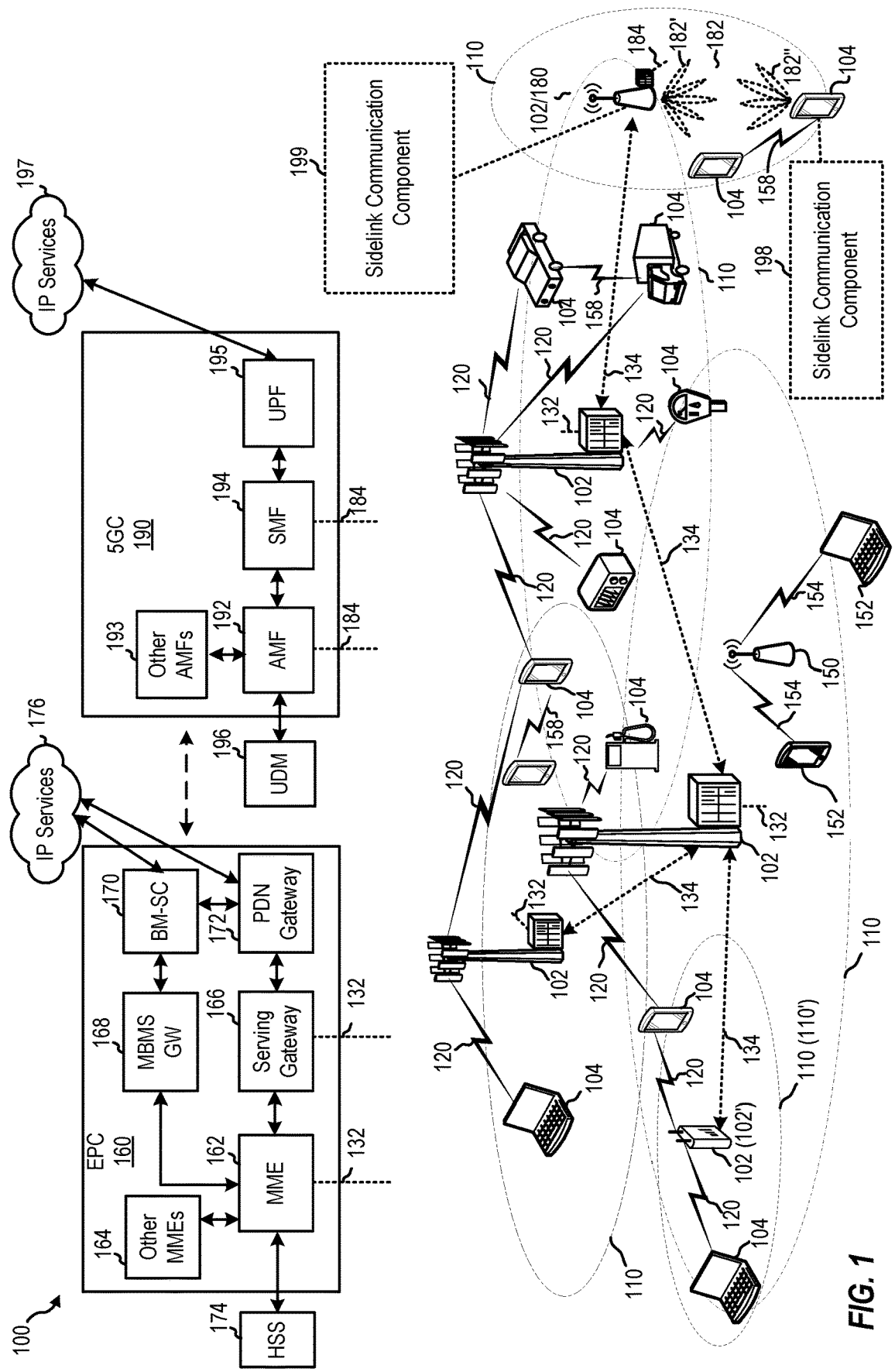
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes sidelink communication 199, which may be configured to perform operations for sidelink DRX alignment, such as illustrated in one or more of FIG. 7, 9, 10, or 12. Wireless network 100 further includes sidelink communication 198, which may be used configured to perform operations for sidelink DRX alignment, such as illustrated in one or more of FIG. 7, 8, 10, 11, 13, or 14.

Figure 2:
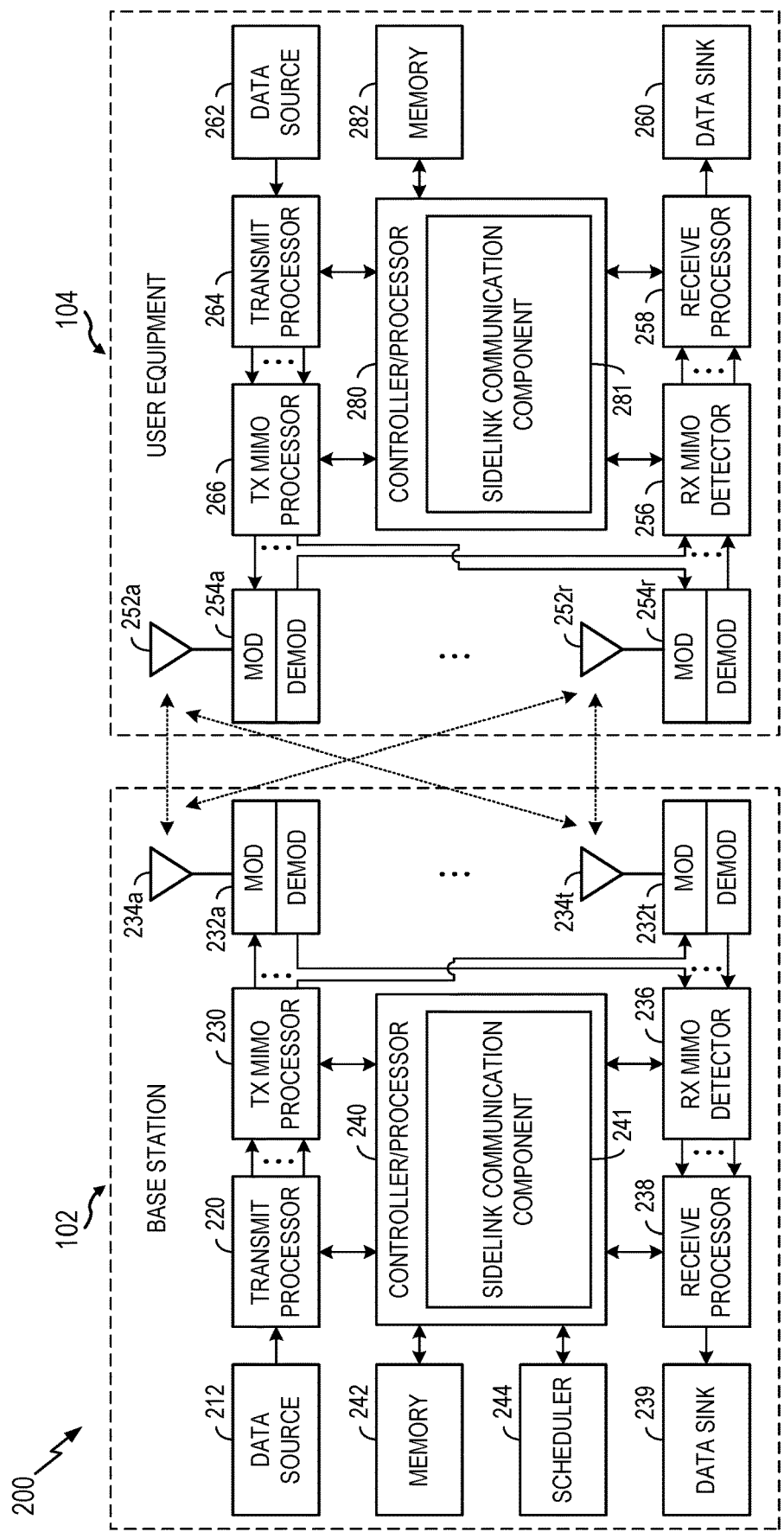
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes sidelink communication component 241, which may be representative of sidelink communication component 199 of FIG. 1. Notably, while depicted as an aspect of controller/processor 240, sidelink communication component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes sidelink communication component 281, which may be representative of sidelink communication component 198 of FIG. 1. Notably, while depicted as an aspect of controller/processor 280, sidelink communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Discontinuous Reception (DRX) During Sidelink Communications

Aspects described herein relate to procedures and signaling to aligning air interface (network) DRX configurations with sidelink DRX configurations.

In particular, consider that two user equipments participating in sidelink communications (e.g., a transmitting or Tx UE and a receiving or Rx UE) may be in different radio resource control (RRC) connection states during sidelink communications. For example, both the Tx UE and Rx UE may be in a RRC connected state; the Tx UE may be in in an RRC inactive/idle state while the Rx UE is in an RRC connected state; the Tx UE may be in an RRC connected state while the Rx UE is in an RRC inactive/idle state; or both the Tx UE and the Rx UE may be in an RRC inactive/idle state. Generally, during these various state permutations, different types of alignment may be beneficial.

For example, in a "Type 1" alignment, an air interface DRX configuration and a sidelink DRX are aligned for a Rx UE. In such a case, if the Rx UE is RRC connected, the air interface DRX may be a timer-based connected-DRX (C-DRX), and if the Rx UE is RRC inactive or idle, then the air interface DRX may be a paging based inactive/idle-DRX (I-DRX).

As another example, in a "Type 2" alignment, an Rx UE's sidelink DRX configuration is aligned with a Tx UE's air interface DRX configuration. In such a case, if the Tx UE is RRC connected, then the air interface DRX is timer-based C-DRX, and if the Tx UE is RRC inactive/idle, then there is no need to make a Type 2 alignment as the Tx UE receives no sidelink grant from the network (e.g., from a base station/gNB) and works in mode 2.

Notably, when both the Tx UE's air interface DRX and the Rx UE's air interface DRX are aligned with the Rx UE's SL DRX, then all three DRX cycles are aligned. Thus, aspects described herein relate to signaling for a unified procedure for aligning DRX configurations.

Aspects Related to Sidelink Discontinuous Reception (DRX) Alignment

Figure 4:
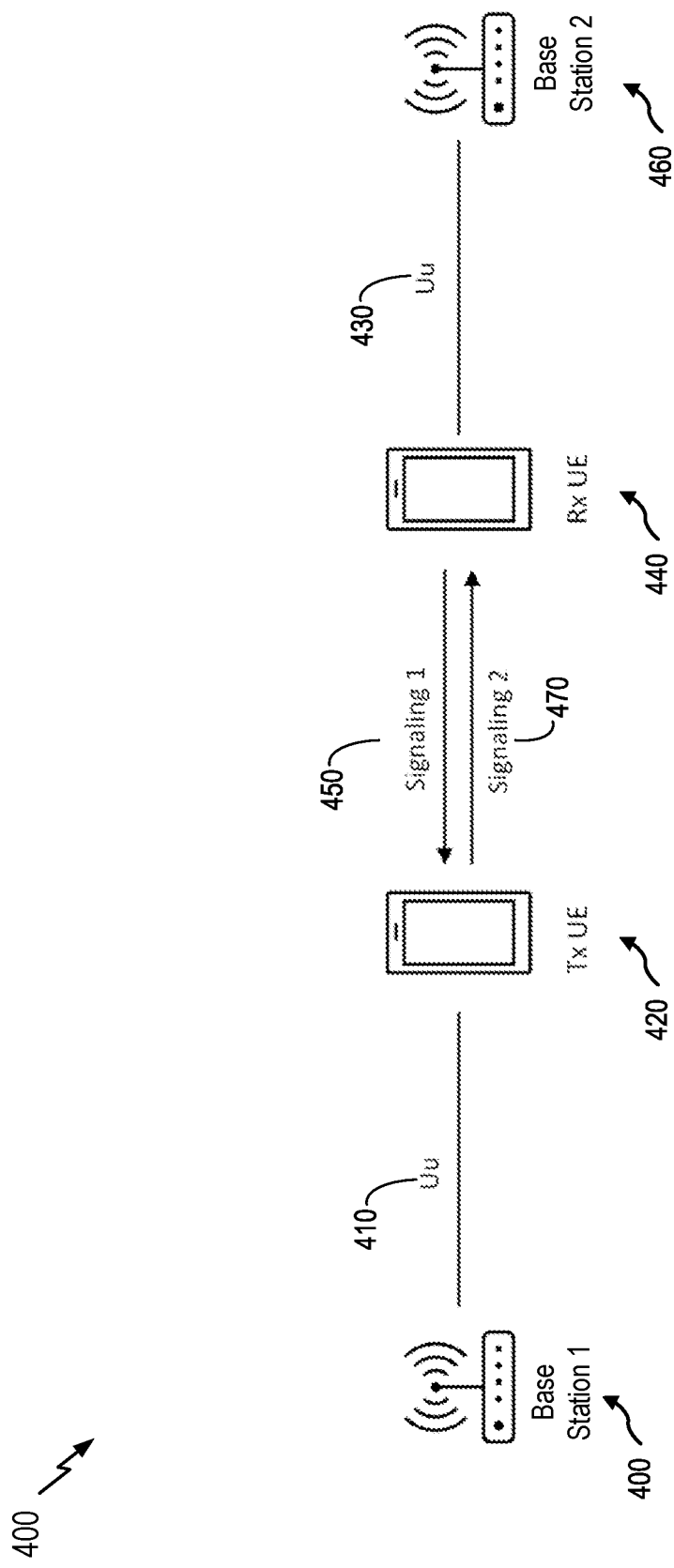
FIG. 4 illustrates an example of sidelink communications between two user equipments.

FIG. 4 depicts an example of concurrent network and sidelink communications between user equipments within a wireless communication network, such as the wireless communication network 100.

Specifically, FIG. 4 illustrates various communications between a first base station 400, a transmit user equipment (Tx UE) 420, a receive user equipment (Rx UE) 440, and a second base station 460. In some cases, UEs 420 and 440 may be representative of UE 104 of FIG. 1, and BSs 400 and 460 may be representative of BS 102 of FIG. 1.

As shown, base station 400 may communicate with Tx UE 420 over an air interface 410. Similarly, the base station 460 may communicate with Rx UE 440 over an air interface 430. In some cases, the air interfaces 410 and 430 are a Uu interface. The Tx UE 420 and Rx UE 440 may communicate via sidelink signaling 450 and 470 over a sidelink interface, such as a PC5 interface.

Figure 5:
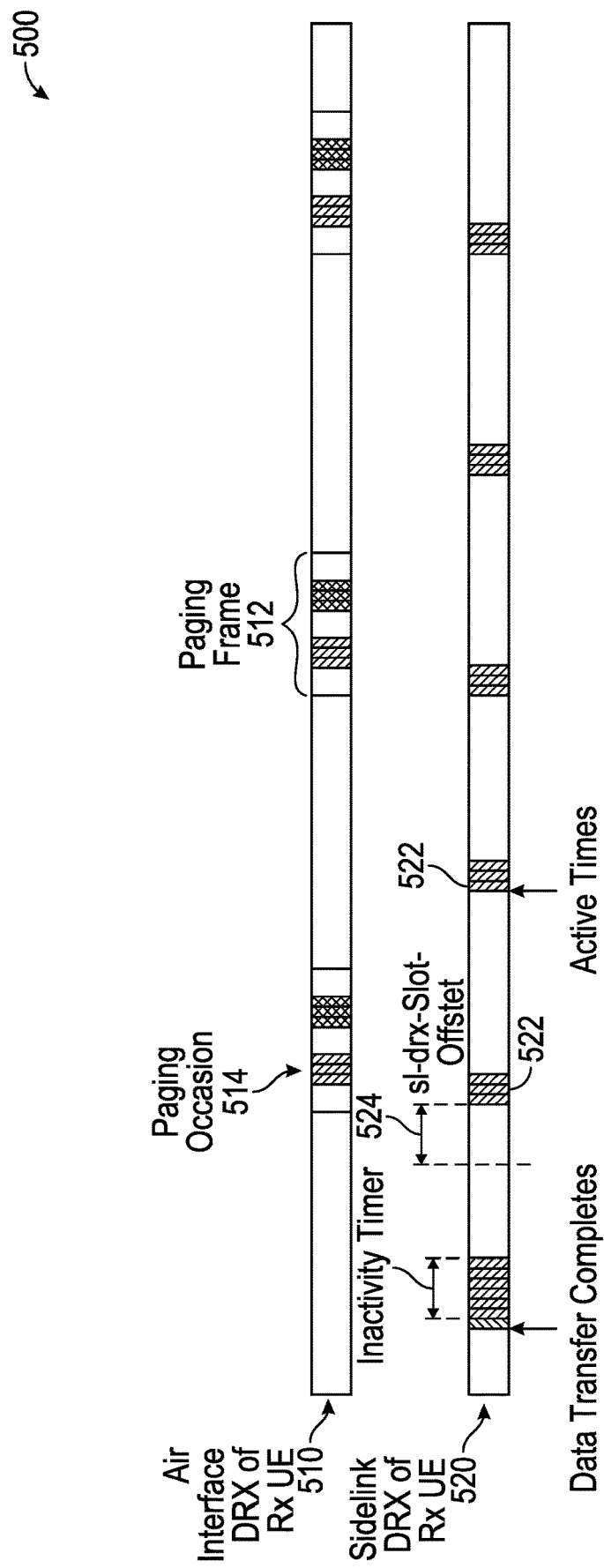
FIG. 5 illustrates an example of misaligned discontinuous reception occasions for a user equipment.

FIG. 5 depicts an example of misaligned DRX occasions for a receiver user equipment (Rx UE) participating in sidelink communications.

In particular, FIG. 5 depicts a first air interface (e.g., Uu air interface) DRX configuration (or cycle) 510 for an Rx UE with a series of paging frames (e.g., 512) containing a plurality of paging occasions (e.g., 514). FIG. 5 further depicts a sidelink DRX configuration 520 for the Rx UE with a various active times (e.g., 522), which are defined to begin after a slot offset period 524 (e.g., a period defined by the beginning or end of a slot).

As is depicted in FIG. 5, the air interface DRX configuration 510 and the sidelink DRX configuration 520 do not include overlapping active times. When the air interface DRX configuration 510 and sidelink DRX configuration 520 are misaligned, the Rx UE may end up being active more often than necessary, resulting in increased power consumption.

Figure 6:
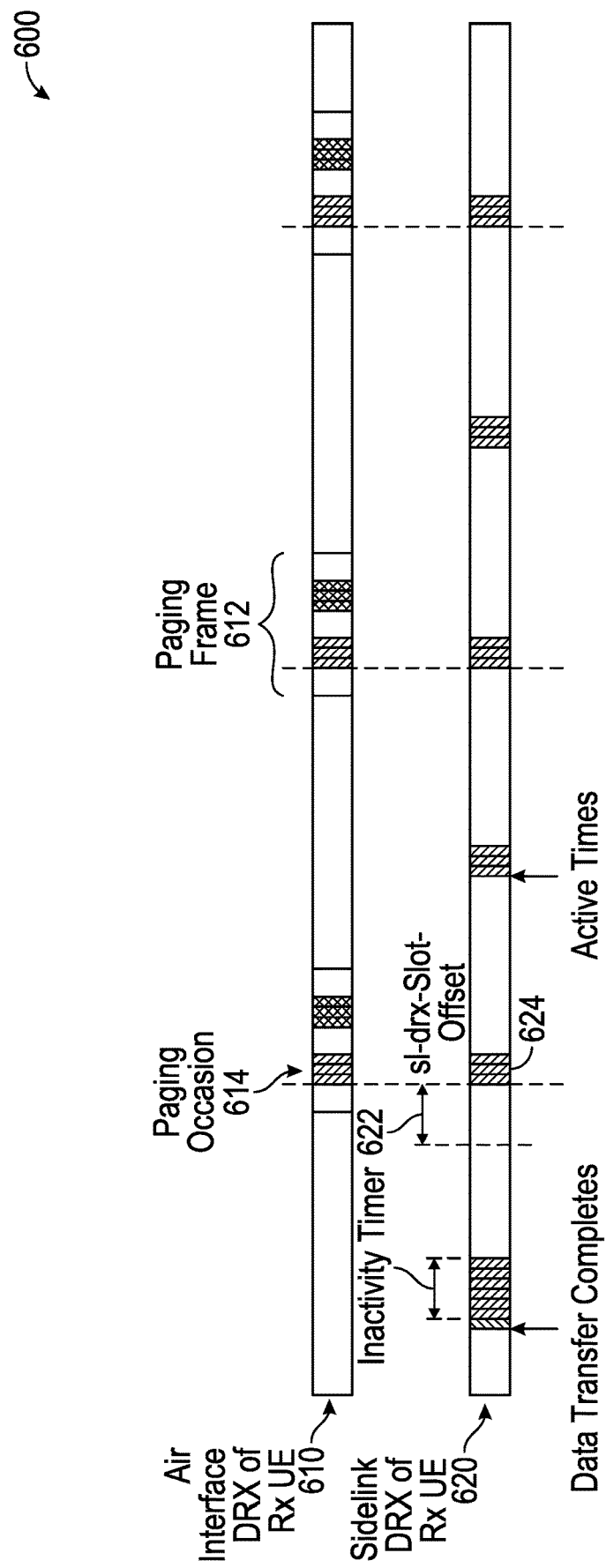
FIG. 6 illustrates an example of aligned discontinuous reception occasions for a user equipment.

FIG. 6, in comparison, depicts an example of aligned DRX configuration with overlapping active times. In the depicted example, the slot offset 622 of the sidelink DRX configuration has been changed so that the active time 624 in the sidelink DRX configuration aligns with the paging occasions 614 in the paging frame 612 of the air interface DRX configuration.

Example Call Flow Illustrating Sidelink Discontinuous Reception (DRX) Alignment

Figure 7:
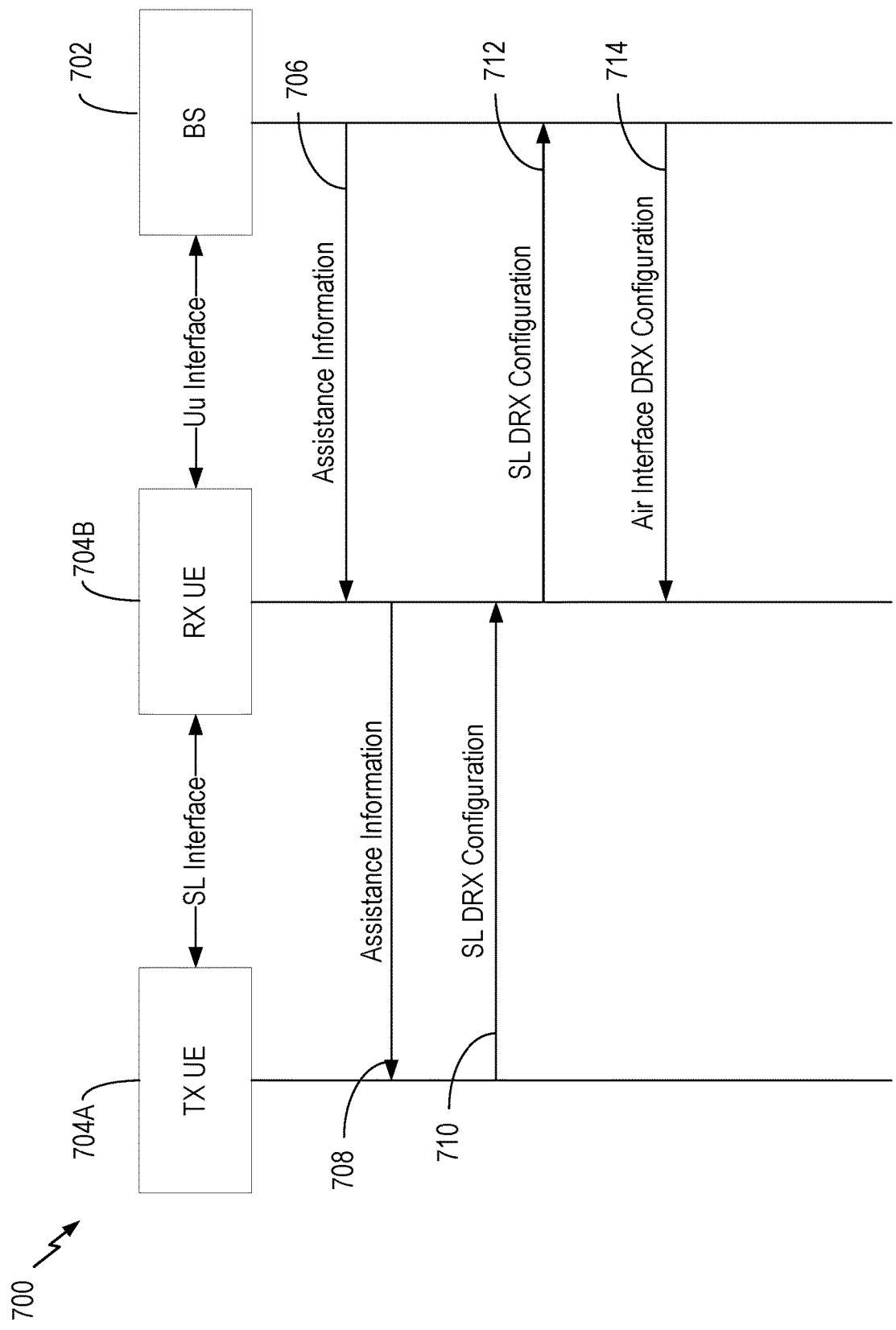
FIG. 7 is a call flow diagram illustrating example communications between a base station, a receiver user equipment, and a transmitter user equipment according to various aspects described herein.

FIG. 7 depicts a call flow diagram illustrating example operations 700 between a base station (BS) 702, a receiver (Rx) user equipment (UE) 704B, and a transmitter (Tx) user equipment (UE) 704A according to various aspects described herein. In some cases, the BS 702 may be an example of the BS 102 illustrated in FIG. 1. Similarly, the UEs 704A and 704B may be an example of the UE 104 illustrated in FIG. 1.

In the example depicted in FIG. 7, the Rx UE 704B is in an RRC connected mode. For example, a Uu interface may be established to facilitate communication between the BS 702 and the Rx UE 704B. However, in other aspects, a different type of interface may be used. Further in this example, the Tx UE 704A is in an inactive or idle mode, and therefore there is no Uu interface (or otherwise) with a base station depicted. A sidelink interface (e.g., a PC5 interface) may be established to facilitate communication between the Tx UE 704A and the Rx UE 704B as shown, however, in other aspects, a different type of interface may be used.

As illustrated, the operations 700 illustrated in FIG. 7 begin at operation 706 with BS 702 transmitting, to the Rx UE 704B, assistance information. In some cases, the assistance information may be discontinuous reception (DRX) configuration assistance information. In one aspect, the DRX configuration assistance information may comprise an initial air interface (e.g., network) DRX configuration for the Rx UE. In another aspect, the DRX configuration assistance information may comprise one or more available air interface DRX configurations for the Rx UE. In another aspect, the DRX configuration assistance information may comprise one or more existing sidelink connect mode DRX configurations for one or more other UEs.

In one aspect, the DRX configuration assistance information may be received from the BS in a radio resource control (RRC) message. For example, the RRC message may comprise a DownlinkConfigCommonSIB information element comprising the assistance information. The RRC message may alternatively comprise a Downlink-PCCH-Config information element comprising the assistance information.

In another aspect, the DRX configuration assistance information may be received in a medium access control-control element (MAC-CE) message. In some aspects, for example, the MAC-CE may include a pointer to a value of a preconfigured set of values for the assistance information, which obviates needing to send all of the DRX configuration data over the air interface. In such cases, a user equipment may be configured with various configurations that may be indicated by the pointer Thereafter, in operation 708, the Rx UE 704B transmits the assistance information to the Tx UE 704. The assistance information may generally include the DRX configuration assistance information received from BS 702 at operation 706, or some subset thereof.

Thereafter, in operation 710, the Tx UE 704A transmits sidelink DRX configuration information to the Rx UE 704B. The sidelink DRX configuration information may be based on the DRX configuration assistance information. For example, the sidelink DRX configuration information may cause at least one active air interface DRX on period (e.g., a DRX on duration in which the UE is able to receive data) and one active sidelink DRX on period (e.g., a DRX on duration) to align in time, as illustrated in FIG. 6.

In one aspect, the sidelink DRX configuration information may comprise a sidelink (SL) DRX start offset parameter value, such as sl-drx-StartOffset. In another aspect, the sidelink DRX configuration information may comprise a sidelink DRX slot offset parameter value, such as sl-drx-SlotOffset. In another aspect, the sidelink DRX configuration information may comprise a sidelink DRX cycle parameter value, such as sl-drx-Cycle.

Thereafter, in operation 712, the Rx UE 704B transmits the sidelink DRX configuration information to the BS 702.

Thereafter, in operation 714, the BS 702 transmits modified air interface DRX configuration information to the Rx UE 704B. The modified air interface DRX configuration may be based on the sidelink DRX configuration received from the Rx UE in operation 712. That is, because BS 702 now knows the sidelink configuration being used by Tx UE 704A and Rx UE 704B, the BS 702 may adjust the air interface DRX configuration to create an alignment, as discussed above.

In one aspect, the modified air interface DRX configuration information may comprise a default paging cycle parameter value, such as defaultPagingCycle parameter value. In another aspect, the modified air interface DRX configuration information may comprise a paging frame offset parameter value indicating a number of total paging frames, such as a nAndPagingFrameOffset parameter value. In another aspect, the modified air interface DRX configuration information may comprise physical downlink control channel (PDCCH) monitoring occasion parameter value indicating the first PDCCH monitoring occasion for each paging occasion in the paging frame, such as a firstPDCCH-MonitoringOccasionOfPO parameter value. In another aspect, the modified air interface DRX configuration information may comprise a paging occasion parameter value indicating a number of paging occasions in a paging frame, such as a ns parameter value.

In the example of FIG. 7, Tx UE 704A is RRC inactive/idle, and thus Tx UE 704A has no signaling with its base station (not depicted) during operations 700. Consequently, Tx UE 704A's base station (not depicted) is not involved in the sidelink DRX configuration for Rx UE 704B nor the alignment of the air interface DRX configuration and the sidelink DRX configuration. In particular, in this example, Tx UE 704A does not monitor DCI 3. Rather, Tx UE 702A sets the sidelink DRX configuration for Rx UE 704B and Rx UE 704B's base station sets the air interface DRX configuration for Rx UE 704B. Thus, both Tx UE 704A and Rx UE 704B's connected base station 702 are responsible for the alignment between air interface DRX configuration and sidelink DRX configuration for Rx UE 704B.

Notably, in the example of FIG. 7, there is no need to consider the alignment of Tx UE 704A's air interface DRX configuration and Rx UE's sidelink DRX configuration. Rather, only the alignment of the air interface DRX configuration and the sidelink DRX configuration for Rx UE 704B is considered.

Figure 8:
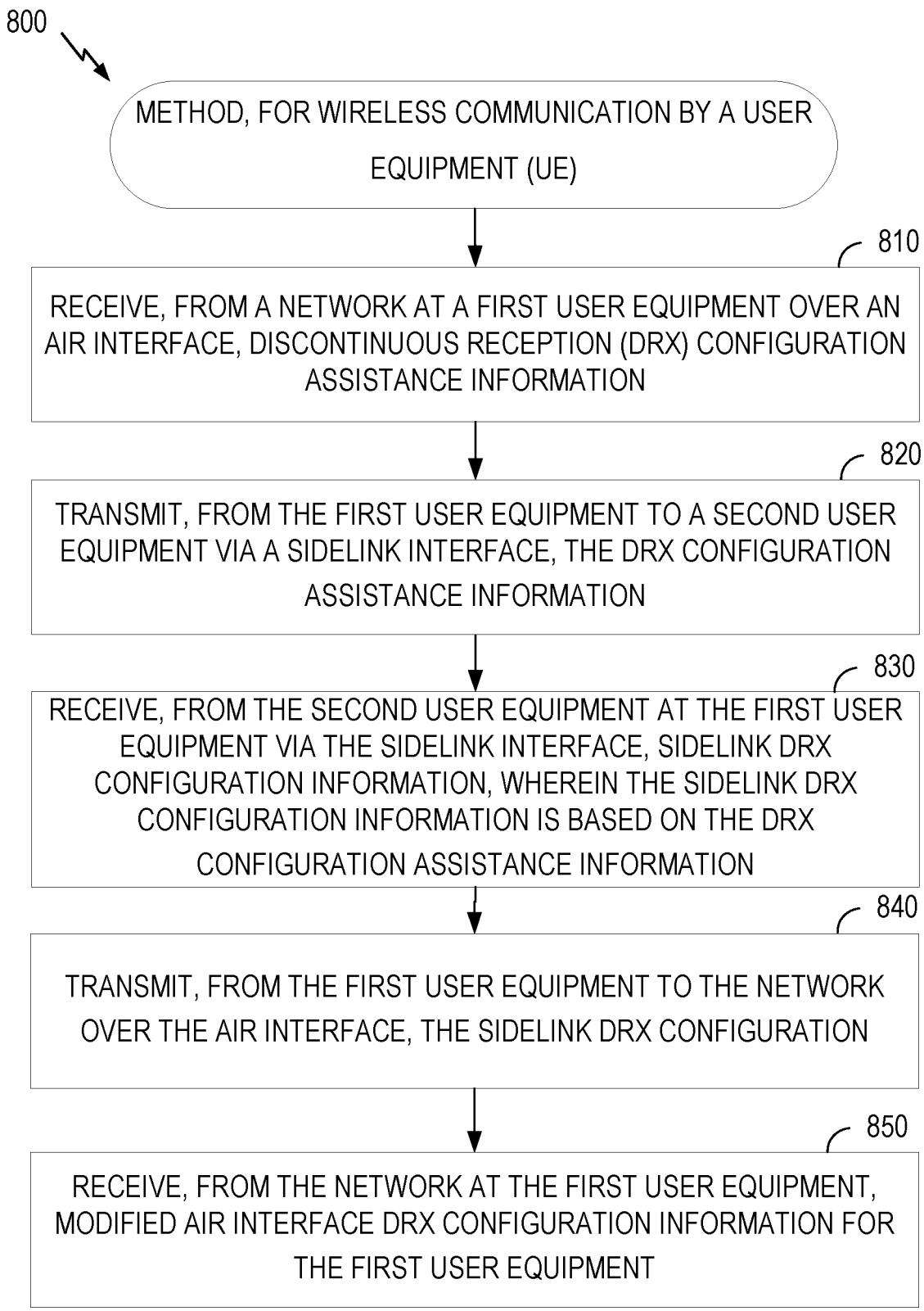
FIG. 8 depicts example operations for wireless communication by a user equipment.

FIG. 8 is a flow diagram illustrating example operations 800 for wireless communication, in accordance with certain aspects of the present disclosure. Generally, the operations 800 may correspond with certain operations depicted in FIG. 7. The operations 800 may be performed, for example, by a UE (e.g., such as the UE 104 of the wireless communication network 100 of FIG. 1). The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2.). In certain aspects, the transmission and/or reception of signals by the UE may be implemented via a bus interface of one or more processors (e.g., controller/processor 280) obtaining and/or outputting signals.

The operations 800 begin at operation 810 with receiving, from a network at a first user equipment over an air interface, discontinuous reception (DRX) configuration assistance information.

In operation 820, the first UE transmits, to a second user equipment via a sidelink interface, the DRX configuration assistance information.

In operation 830, the first UE receives, from the second user equipment the sidelink interface, sidelink DRX configuration information, wherein the sidelink DRX configuration information is based on the DRX configuration assistance information.

In operation 840, the first UE transmits, to the network over the air interface, the sidelink DRX configuration.

In operation 850, the first UE receives, from the network, modified air interface DRX configuration information for the first user equipment.

In some aspects, operations 800 may further include configuring one or more air interface DRX configuration parameters at the first user equipment based on the modified air interface DRX configuration information; and configuring one or more sidelink DRX configuration parameters at the first user equipment based on the sidelink DRX configuration information. In some cases, the one or more air interface DRX configuration parameters and the one or more sidelink DRX configuration parameters cause at least one active air interface DRX on period and one active sidelink DRX on period to align in time.

In some aspects, the DRX configuration assistance information includes an initial air interface DRX configuration for the first user equipment. In some aspects, the DRX configuration assistance information includes one or more available air interface DRX configurations for the first user equipment. In some aspects, the DRX configuration assistance information includes one or more existing sidelink connected mode DRX configurations for one or more other user equipment. In some aspects, the DRX configuration assistance information includes or a preferred sidelink connected mode DRX configuration for the first user equipment.

In some aspects, the DRX configuration assistance information is received from the network in a radio resource control (RRC) message. In one example, the RRC message may comprise a DownlinkConfigCommonSIB information element comprising the assistance information. In another example, the RRC message may comprise a Downlink-PCCH-Config information element comprising the assistance information.

In some aspects, the DRX configuration assistance information is received in a medium access control-control element (MAC-CE) message. In one example, the MAC-CE may include a pointer to a value of a preconfigured set of values for the assistance information.

In one aspect, the modified air interface DRX configuration information may comprise a default paging cycle parameter value, such as defaultPagingCycle parameter value. In another aspect, the modified air interface DRX configuration information may comprise a paging frame offset parameter value indicating a number of total paging frames, such as a nAndPagingFrameOffset parameter value. In another aspect, the modified air interface DRX configuration information may comprise a physical downlink control channel (PDCCH) monitoring occasion parameter value indicating the first PDCCH monitoring occasion for each paging occasion in the paging frame, such as a firstPDCCH- MonitoringOccasionOfPO parameter value. In another aspect, the modified air interface DRX configuration information may comprise a paging occasion parameter value indicating a number of paging occasions in a paging frame such as a ns parameter value. In one aspect, the sidelink DRX configuration information may comprise a sidelink DRX start offset parameter value, such as sl-drx-StartOffset. In another aspect, the sidelink DRX configuration information may comprise a sidelink DRX slot offset parameter value, such as sl-drx-SlotOffset. In another aspect, the sidelink DRX configuration information may comprise a sidelink DRX cycle parameter value, such as sl-drx-Cycle.

In some cases, the air interface may comprise a Uu interface.

In some cases, the first user equipment is in a connected state with respect to the network, and the second user equipment is in an inactive or an idle state with respect to the network.

Figure 9:
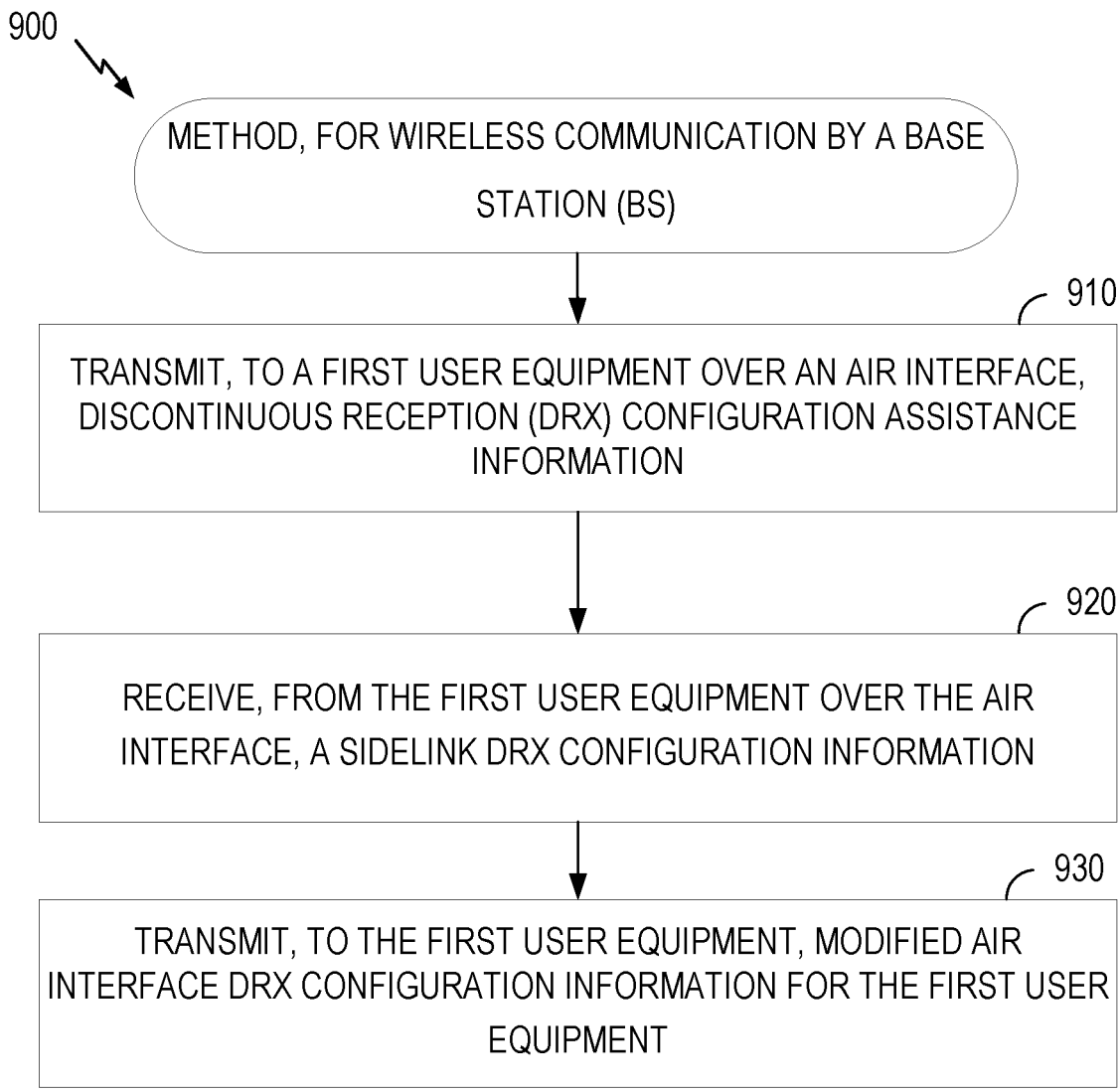
FIG. 9 depicts example operations for wireless communication by a base station.

FIG. 9 is a flow diagram illustrating example operations 900 for wireless communication, in accordance with certain aspects of the present disclosure. Generally, the operations 900 may correspond with certain operations depicted in FIG. 7. The operations 900 may be performed, for example, by a base station (e.g., such as the BS 102 of the wireless communication network 100 of FIG. 1). The operations 900 may be complementary to the operations 800 performed by the UE in FIG. 8. The operations 900 may be implemented as software components that are executed and run on one or more processors (e.g., controller/processor 240 of FIG. 2). Further, the transmission and reception of signals by the UE in operations 900 may be enabled, for example, by one or more antennas (e.g., antennas 234 of FIG. 2.). In certain aspects, the transmission and/or reception of signals by the BS may be implemented via a bus interface of one or more processors (e.g., controller/processor 240) obtaining and/or outputting signals.

The operations 900 begin, at 910, with transmitting to a user equipment (UE) over an air interface, discontinuous reception (DRX) configuration assistance information.

In operation 920, the BS receives, from the first user equipment over the air interface, sidelink DRX configuration information.

In operation 930, the BS transmits, to the first user equipment, modified air interface DRX configuration information for the first user equipment.

In some cases, the BS transmits the DRX configuration assistance information to the first user equipment in a radio resource control (RRC) message. In other examples, the BS transmits the DRX configuration assistance information in a medium access control-control element (MAC-CE) message.

In some cases, the first user equipment is in a connected state with respect to a network, and a second user equipment is in an inactive or an idle state with respect to the network.

Figure 10:
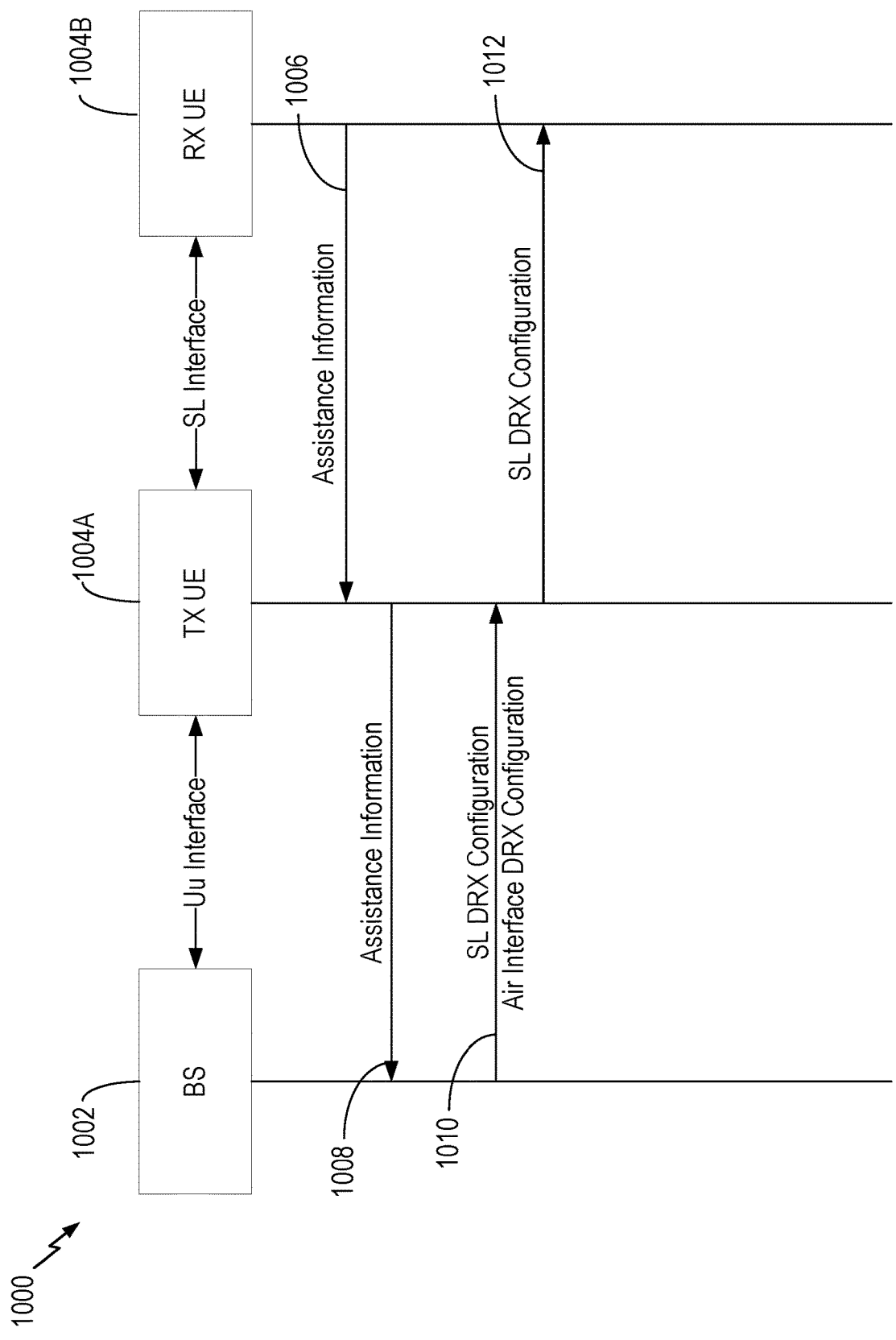
FIG. 10 depicts a call flow diagram illustrating example communications between a base station, a receiver user equipment, and a transmitter user equipment according to various aspects described herein.

FIG. 10 depicts a call flow diagram illustrating example operations 1000 between a base station (BS) 1002, a transmitter (Tx) user equipment (UE) 1004A, and a receiver (Rx) user equipment (UE) 1004B, according to various aspects described herein. In some cases, the BS 1002 may be an example of the BS 102 illustrated in FIG. 1. Similarly, the UE 1004A, 1004B may be an example of the UE 104 illustrated in FIG. 1.

In the example depicted in FIG. 10, the Tx UE 704A is in an RRC connected mode, in contrast to the previous example depicted in FIG. 7 when the Rx UE 704B was in a connected mode. Further, as shown, an air interface (Uu in this example) is established to facilitate communication between the BS 1002 and the Tx UE 1004A, however, in other aspects, a different type of interface may be used. Further, a sidelink interface is established to facilitate communication between the Rx UE 1004B and the Tx UE 1004A; however, in other aspects, a different type of interface may be used.

As illustrated, the operations 1000 illustrated in FIG. 10 begin at 1006 with Rx UE 1004B transmitting, to the Tx UE 1004A, assistance information. As above, the assistance information may be DRX configuration assistance information. In one aspect, the DRX configuration assistance information may comprise an initial air interface DRX configuration for the Rx UE. In another aspect, the DRX configuration assistance information may comprise one or more available air interface DRX configurations for the Rx UE. In another aspect, the DRX configuration assistance information may comprise one or more existing sidelink connect mode DRX configurations for one or more other UE. In another aspect, the DRX configuration assistance information may comprise a preferred sidelink connected mode DRX configuration by the Rx UE or Rx UE's BS. In this aspect, the Rx UE may take into account its air interface connected mode DRX configuration when requesting the preferred sidelink connected mode DRX configuration.

Thereafter, in block 1008, the Tx UE 704A transmits assistance information to the BS 1002. In some cases, the assistance information includes the DRX configuration assistance information (or some part of it) received at operation 1006 from Rx UE 1006.

Thereafter, in operation 1010, the BS 1002 transmits sidelink DRX configuration information and modified air interface DRX configuration information to the Tx UE 1004A. The air interface may be a Uu in various aspects. The sidelink DRX configuration information may be based on DRX configuration assistance information. For example, the sidelink DRX configuration information may cause at least one active air interface DRX on period (e.g., DRX on duration) and one active sidelink DRX on period (e.g., DRX on duration) to align in time. The sidelink DRX configuration information may further include configuration information for both Tx UE 1004A and Rx UE 1004B.

In one aspect, the modified air interface DRX configuration information may comprise a default paging cycle parameter value, such as defaultPagingCycle parameter value. In another aspect, the modified air interface DRX configuration information may comprise a parameter defining a number of paging frames, such as a nAndPagingFrameOffset parameter value. In another aspect, the modified air interface DRX configuration information may comprise PDCCH monitoring occasion, such as a firstPDCCH-MonitoringOccasionOfPO parameter value. In another aspect, the modified air interface DRX configuration information may comprise parameter defining a number of paging occasions for a paging frame, such as a ns parameter value.

In one aspect, the sidelink DRX configuration information may comprise a sidelink DRX start offset parameter value, such as sl-drx-StartOffset. In another aspect, the sidelink DRX configuration information may comprise a sidelink DRX slot offset parameter value, such as sl-drx-SlotOffset. In another aspect, the sidelink DRX configuration information may comprise a sidelink DRX cycle parameter value, such as sl-drx-Cycle.

Thereafter, in operation 1012, the Tx UE 1004A transmits the sidelink DRX configuration information to the Rx UE 1004B. For example, Tx UE 1004A forwards sidelink DRX configuration information received from BS 1002 to Rx UE 1004B in order that Rx UE 1004B can apply the configuration.

In the example of FIG. 10, Rx UE 1004B does not have signaling with its base station (not pictured), so when Rx UE 1004B generates assistance information, it does not include a list of available air interface DRX configurations. Further, Rx UE 1004B does not report its sidelink DRX to its base station (not pictured). Rather, all DRX alignments are made by Tx UE 1004A and Tx UE 1004A's base station 1002, including type 1 alignment of Tx UE 1004A's sidelink DRX with Rx UE 1004B's paging occasion, as well as type 2 alignment of Rx UE 1004B's sidelink DRX with Rx UE 1004B's paging occasion. Because Rx UE 1004B's base station is not involved with the depicted procedure, Rx UE 1004B's air interface DRX configuration is not changed by operations 1000.

Figure 11:
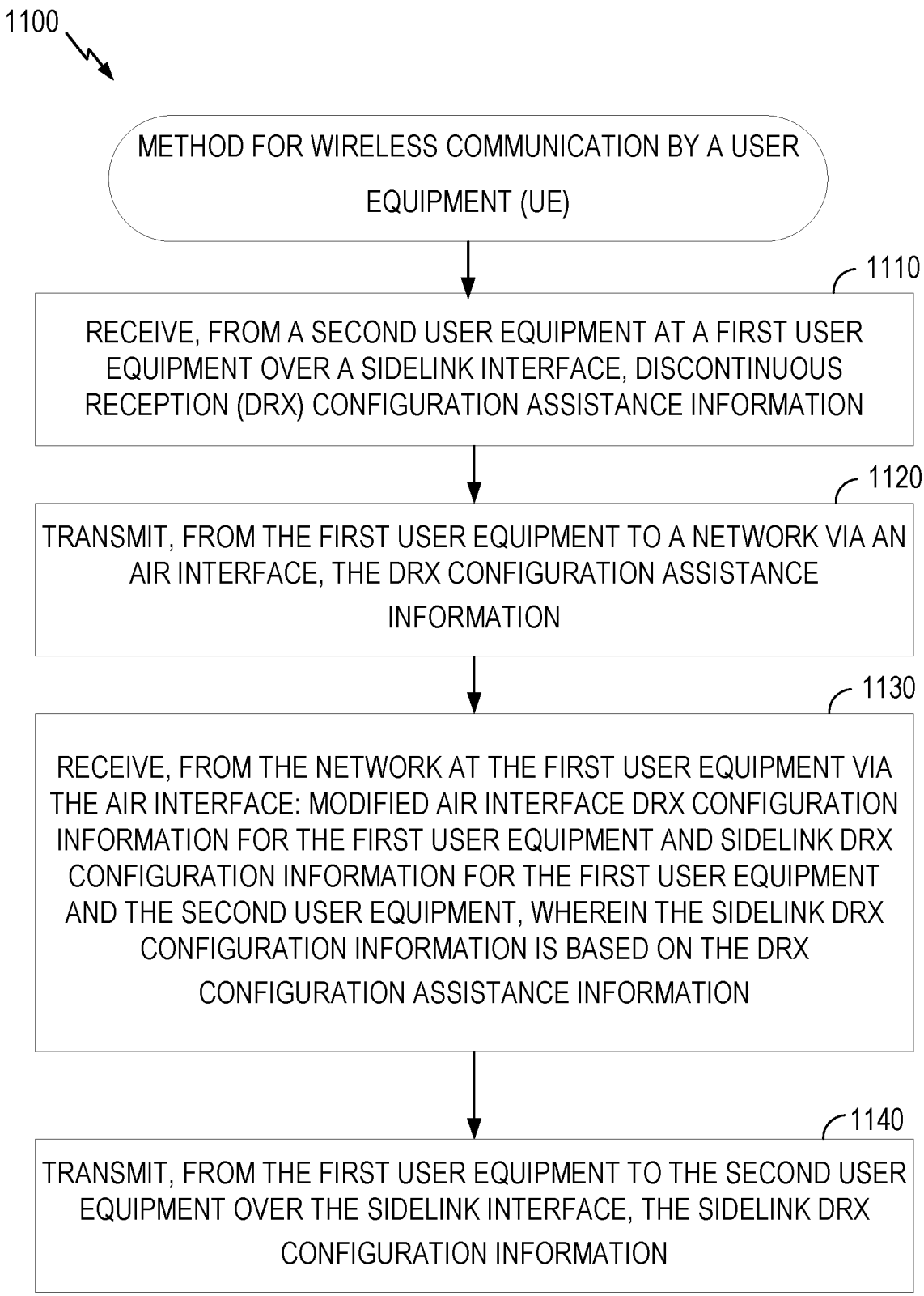
FIG. 11 depicts example operations for wireless communication by a user equipment.

FIG. 11 is a flow diagram illustrating example operations 1100 for wireless communication, in accordance with certain aspects of the present disclosure. Generally, the operations 1100 may correspond with certain operations depicted in FIG. 10. The operations 1100 may be performed, for example, by a UE (e.g., such as the UE 104 of the wireless communication network 100 of FIG. 1). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2.). In certain aspects, the transmission and/or reception of signals by the UE may be implemented via a bus interface of one or more processors (e.g., controller/processor 280) obtaining and/or outputting signals.

The operations 1100 begin, at 1110, receiving, from a second user equipment at a first user equipment over a sidelink interface, discontinuous reception (DRX) configuration assistance information In operation 1120, the first UE transmits, to a network via an air interface, the DRX configuration assistance information.

In operation 1130, the first UE receives, from the network, via the air interface: modified air interface DRX configuration information for the first user equipment and sidelink DRX configuration information for the first user equipment and the second user equipment, wherein the sidelink DRX configuration information is based on the DRX configuration assistance information In operation 1140, the first UE transmits, to the second user equipment over the sidelink interface, the sidelink DRX configuration information.

In some cases, operations 1100 may further include configuring one or more air interface DRX configuration parameters at the first user equipment based on the modified air interface DRX configuration information, and configuring one or more sidelink DRX configuration parameters at the first user equipment based on the sidelink DRX configuration information. In some cases, the one or more air interface DRX configuration parameters and the one or more sidelink DRX configuration parameters cause at least one active air interface DRX on period (e.g., DRX on duration) and one active sidelink DRX on period (e.g., DRX on duration) to align in time.

In one example, the DRX configuration assistance information may include an initial air interface DRX configuration for the first user equipment. In another example, the DRX configuration assistance information may include one or more existing sidelink connected mode DRX configurations for one or more other user equipment, or a preferred sidelink connected mode DRX configuration for the first user equipment.

In some cases, the DRX configuration assistance information is received from the network in a radio resource control (RRC) message. In one example, the RRC message may include a DownlinkConfigCommonSIB information element comprising the assistance information. In another example, the RRC message may include a Downlink-PCCH-Config information element comprising the assistance information.

In some cases, the DRX configuration assistance information is received in a medium access control-control element (MAC-CE) message. In one example, the MAC-CE includes a pointer to a value of a preconfigured set of values for the assistance information.

In one aspect, the modified air interface DRX configuration information may comprise a default paging cycle parameter value, such as defaultPagingCycle parameter value. In another aspect, the modified air interface DRX configuration information may comprise a parameter defining a number of paging frames, such as a nAndPagingFrameOffset parameter value. In another aspect, the modified air interface DRX configuration information may comprise PDCCH monitoring occasion, such as a firstPDCCH-MonitoringOccasionOfPO parameter value. In another aspect, the modified air interface DRX configuration information may comprise parameter defining a number of paging occasions for a paging frame, such as a ns parameter value.

In one aspect, the sidelink DRX configuration information may comprise a sidelink DRX start offset parameter value, such as sl-drx-StartOffset. In another aspect, the sidelink DRX configuration information may comprise a sidelink DRX slot offset parameter value, such as sl-drx-SlotOffset. In another aspect, the sidelink DRX configuration information may comprise a sidelink DRX cycle parameter value, such as sl-drx-Cycle.

In some cases, the air interface comprises a Uu interface.

In some cases, the first user equipment is in a connected state with respect to the network, and the second user equipment is in an inactive or an idle state with respect to the network.

Figure 12:
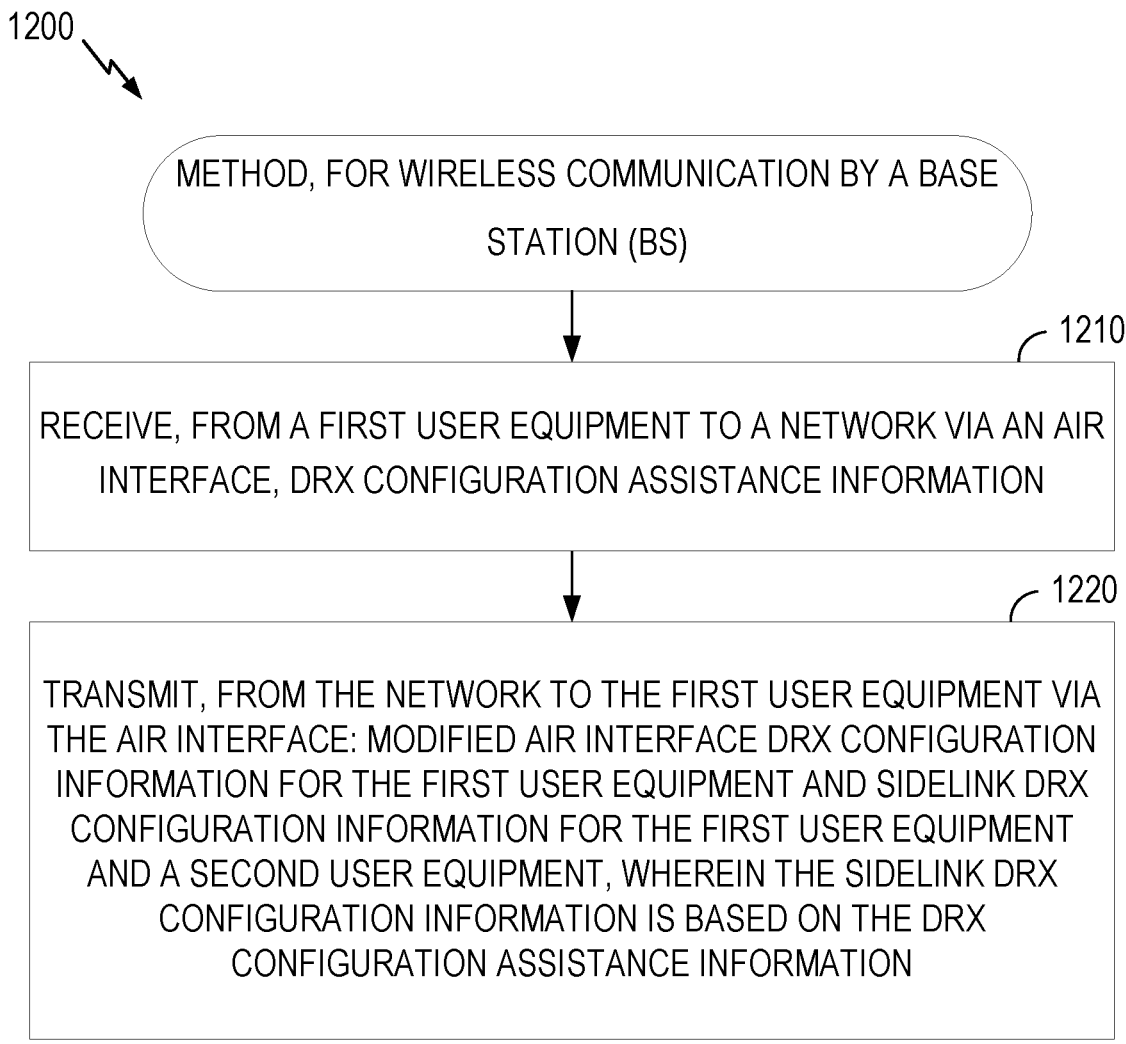
FIG. 12 depicts example operations for wireless communication by a base station.

FIG. 12 is a flow diagram illustrating example operations 1200 for wireless communication, in accordance with certain aspects of the present disclosure. Generally, the operations 1100 may correspond with certain operations depicted in FIG. 10. The operations 1200 may be performed, for example, by a BS (e.g., such as the BS 102 of the wireless communication network 100 of FIG. 1). The operations 1200 may be complementary to the operations 1100 performed by the UE in FIG. 11. The operations 1200 may be implemented as software components that are executed and run on one or more processors (e.g., controller/processor 240 of FIG. 2). Further, the transmission and reception of signals by the UE in operations 1200 may be enabled, for example, by one or more antennas (e.g., antennas 234 of FIG. 2.). In certain aspects, the transmission and/or reception of signals by the BS may be implemented via a bus interface of one or more processors (e.g., controller/processor 240) obtaining and/or outputting signals.

The operations 1200 begin, at 1210, with receiving, from a first user equipment via an air interface, DRX configuration assistance information.

In operation 1220, the BS transmits, to the first user equipment via the air interface: modified air interface DRX configuration information for the first equipment and sidelink DRX configuration information for the first user equipment and a second user equipment. In some cases, the sidelink DRX configuration information is based on the DRX configuration assistance information.

Figure 13:
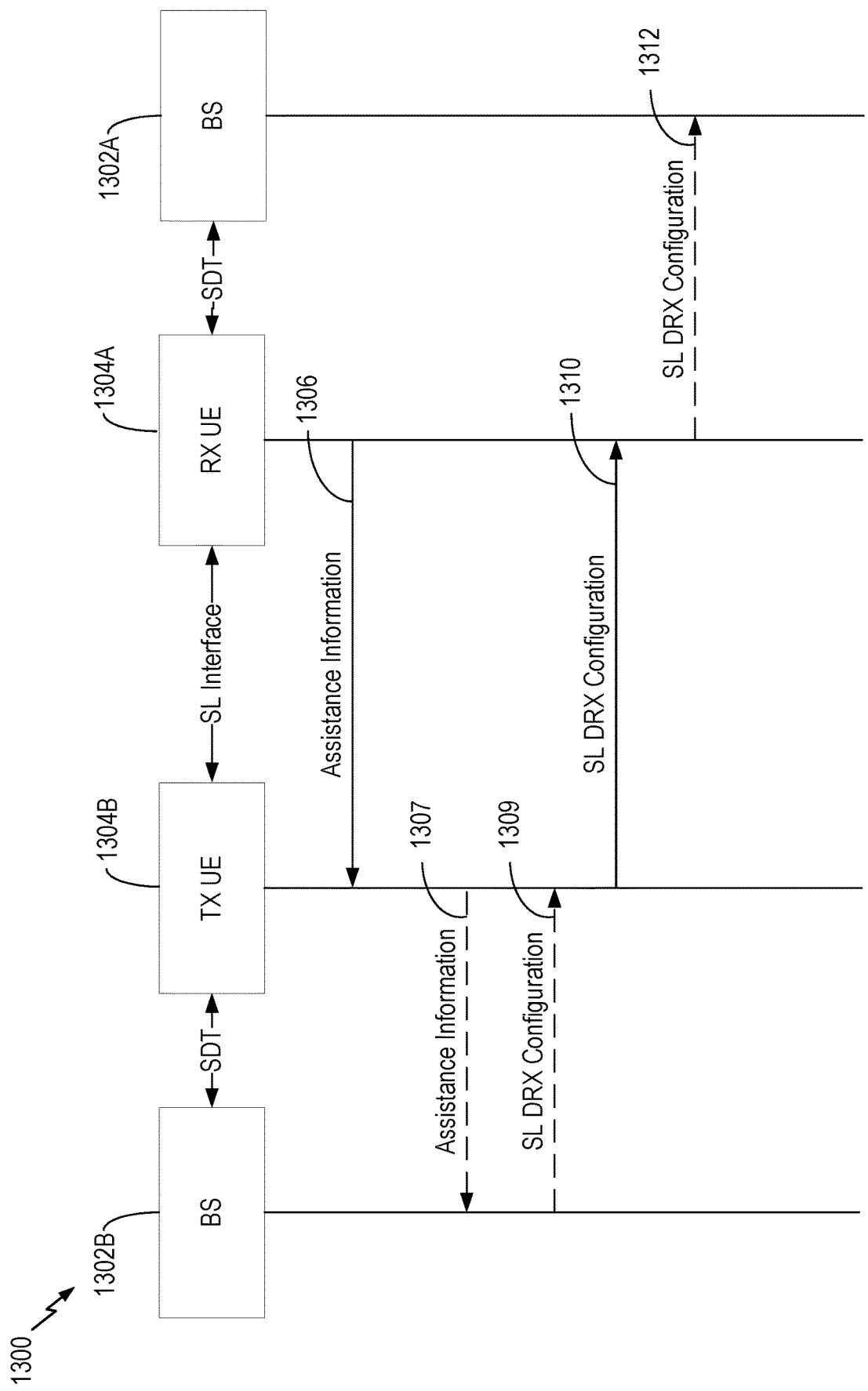
FIG. 13 is a call flow diagram illustrating example communications between a base station, a receiver user equipment, and a transmitter user equipment according to various aspects described herein.

FIG. 13 depicts a call flow diagram illustrating example operations 1300 between a base station (BS) 1302A, 1302B a receiver (Rx) user equipment (UE) 1304A, and a transmitter (Tx) user equipment (UE) 1304B according to various aspects described herein. In some cases, the BS 1302A, 1302B may be an example of the BS 102 illustrated in FIG. 1. Similarly, the UE 1304A, 1304B may be an example of the UE 104 illustrated in FIG. 1. Here, both the Tx UE 1304B and the Rx UE 1304A are in RRC idle/inactive and can perform the alignment without network intervention (e.g., without the intervention of BS 1302A and 1302B).

In the example of FIG. 13, a sidelink interface is established to facilitate communication between the Rx UE 1304A and the Tx UE 1304B as shown, however, in other aspects, a different type of interface may be used.

As illustrated, the operations 1300 illustrated in FIG. 13 begin at 1306 with Rx UE 1304A transmitting, to the Tx UE 1304B, assistance information. In some cases, the assistance information may be discontinuous reception (DRX) configuration assistance information.

Thereafter, in operation 1310, the Tx UE 1304B transmits sidelink DRX configuration information to the Rx UE 1304A. The sidelink DRX configuration information may be based on the DRX configuration assistance information.

In this example, Tx UE 1304B makes the alignment of type 1 timer-based sidelink DRX configuration and paging based air interface I-DRX for Rx UE 1304A. Type 2 alignment of Tx UE 1304B's air interface DRX configuration and Rx UE 1304A's sidelink DRX configuration is not needed in this example because Tx UE 1304B is in RRC inactive/idle mode and thus does not receive sidelink grants from its base station 1302B.

FIG. 13 further depicts the optional use of small data transmission (SDT) communications (as depicted by broken lines) for inactive or idle UEs 1304A and 1304B to get network assistance without requiring either UE to go into an active mode. Generally, SDT transmissions support data transmission without transitioning to an RRC connected state. SDT technologies include early data transmission (EDT) and transmission using pre-configured uplink resource (PUR). The EDT enables a wireless device to receive an uplink grant for SDT in an RRC idle state via a random access procedure for the EDT. The wireless device in the RRC idle state transmits uplink small data using the uplink grant. Beneficially, this allows for getting network assistance (e.g., from base stations 1302A and 1302B) without having to enter an RRC connected mode, thus saving power.

Note that while SDT transmissions are depicted in the example of FIG. 13, they may also apply to the examples in FIGS. 7 and 10 for the user equipments that are not RRC connected to their base stations.

In aspects where the optional steps are implemented, Tx UE 1304B transmits assistance information to the BS 1302B at operation 1307. In some cases, the assistance information may be the DRX configuration assistance information.

Thereafter, in operation 1309, the BS 1302B transmits sidelink DRX configuration information to the Tx UE 1304B.

Thereafter, in operation 1312, the Rx UE 1304A optionally transmits the sidelink DRX configuration information to the BS 1302A.

In operation 1300, the Tx UE 1304B makes the alignment of type 1 timer-based sidelink DRX and paging based Uu I-DRX for the Rx UE 1304A. Type 2 Tx UE 1304B's Uu DRX and Rx UE 1304A's sidelink DRX alignment is not needed, because Tx UE 1304B is in RRC inactive/idly mode. Because it doesn't work in mode 1, it doesn't receive a sidelink grant from its BS 1302B.

Figure 14:
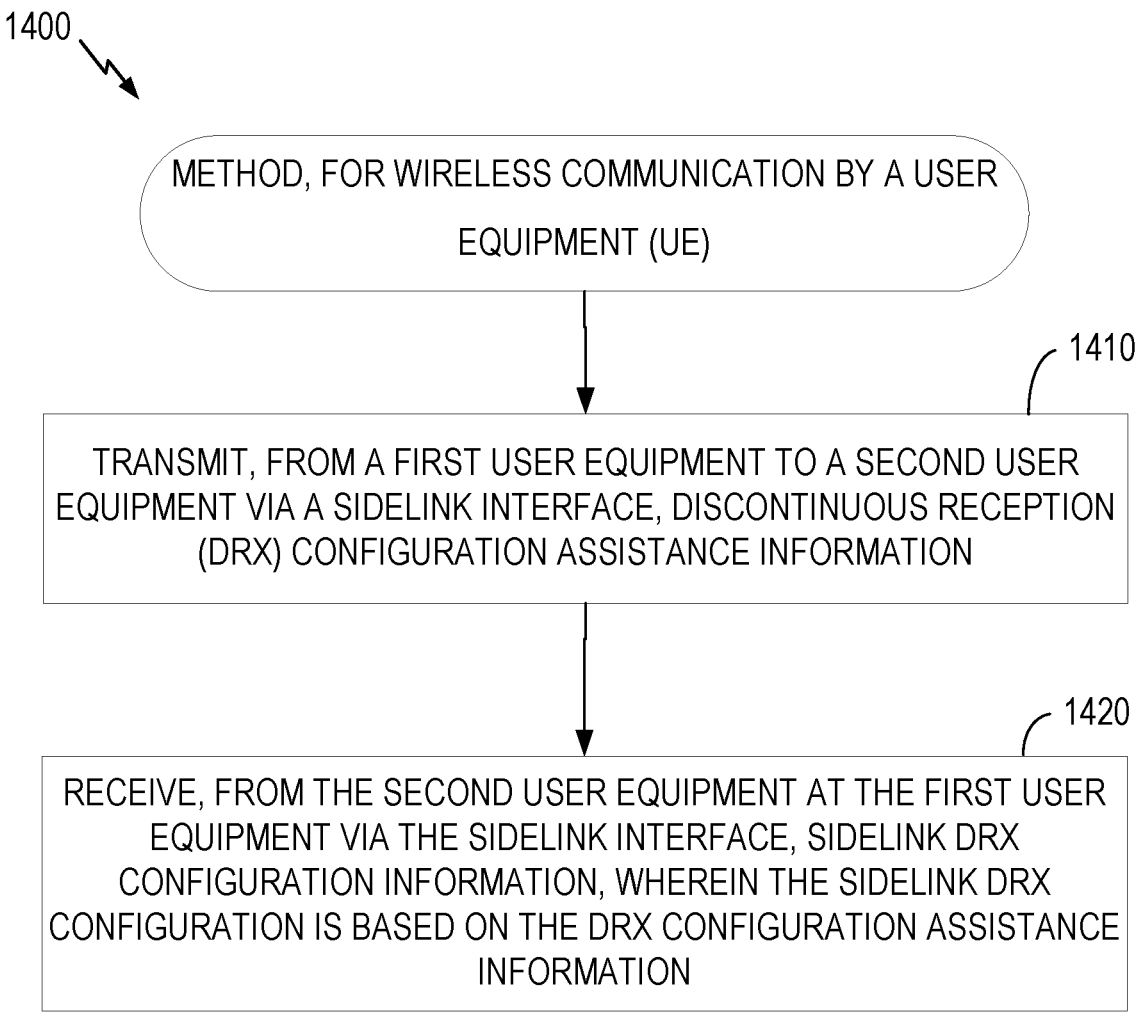
FIG. 14 depicts example operations for wireless communication by a user equipment.

FIG. 14 is a flow diagram illustrating example operations 1400 for wireless communication, in accordance with certain aspects of the present disclosure. Generally, the operations 1400 may correspond with certain operations depicted in FIG. 13. The operations 1400 may be performed, for example, by a UE (e.g., such as the UE 104 of the wireless communication network 100 of FIG. 1). The operations 1400 may be implemented as software components that are executed and run on one or more processors (e.g., controller/processor 280 of FIG. 2). Further, the transmission and reception of signals by the UE in operations 1400 may be enabled, for example, by one or more antennas (e.g., antennas 252 of FIG. 2.). In certain aspects, the transmission and/or reception of signals by the UE may be implemented via a bus interface of one or more processors (e.g., controller/processor 280) obtaining and/or outputting signals.

The operations 1400 begin, at 1410, by transmitting to a second user equipment via a sidelink interface, discontinuous reception (DRX) configuration assistance information.

In operation 1420, the first UE receives, from the second user equipment via the sidelink interface, sidelink DRX configuration information. In some cases, the sidelink DRK configuration is based on the DRX configuration assistance information.

In some cases, operations 1400 may further include configuring one or more sidelink DRX configuration parameters at the first user equipment based on the sidelink DRX configuration information, wherein the sidelink DRX configuration parameters cause at least one active air interface DRX on period (e.g., DRX on duration) and one active sidelink DRX on period (e.g., DRX on duration) to align in time.

In one example, the DRX configuration assistance information includes an initial air interface DRX configuration for the first user equipment. In another example, the DRX configuration assistance information includes a preferred sidelink connected mode DRX configuration for the first user equipment.

In some cases, the sidelink DRX configuration information may include one more of a sl-drx-StartOffset parameter value, a sl-drx-SlotOffset parameter value, or a sl-drx-Cycle parameter value.

In one aspect, the sidelink DRX configuration information may comprise a sidelink DRX start offset parameter value, such as sl-drx-StartOffset. In another aspect, the sidelink DRX configuration information may comprise a sidelink DRX slot offset parameter value, such as sl-drx-SlotOffset. In another aspect, the sidelink DRX configuration information may comprise a sidelink DRX cycle parameter value, such as sl-drx-Cycle.

In some cases, the first user equipment is in an inactive or an idle state with respect to the network, and the second user equipment is in the inactive or the idle state with respect to the network.

In some cases, operations 1400 may further include transmitting, from the first user equipment to a network via a small data transmission, the sidelink DRX configuration information, wherein the first user equipment is in an inactive state.

In some cases, operations 1400 may further include transmitting, from the second user equipment to a network via a first small data transmission, the DRX configuration assistance information, wherein the second user equipment is in an inactive state.

In some cases, operations 1400 may further include receiving, from the network using a second small data transmission, the sidelink DRX configuration information.

Example Wireless Communication Devices

Figure 15:
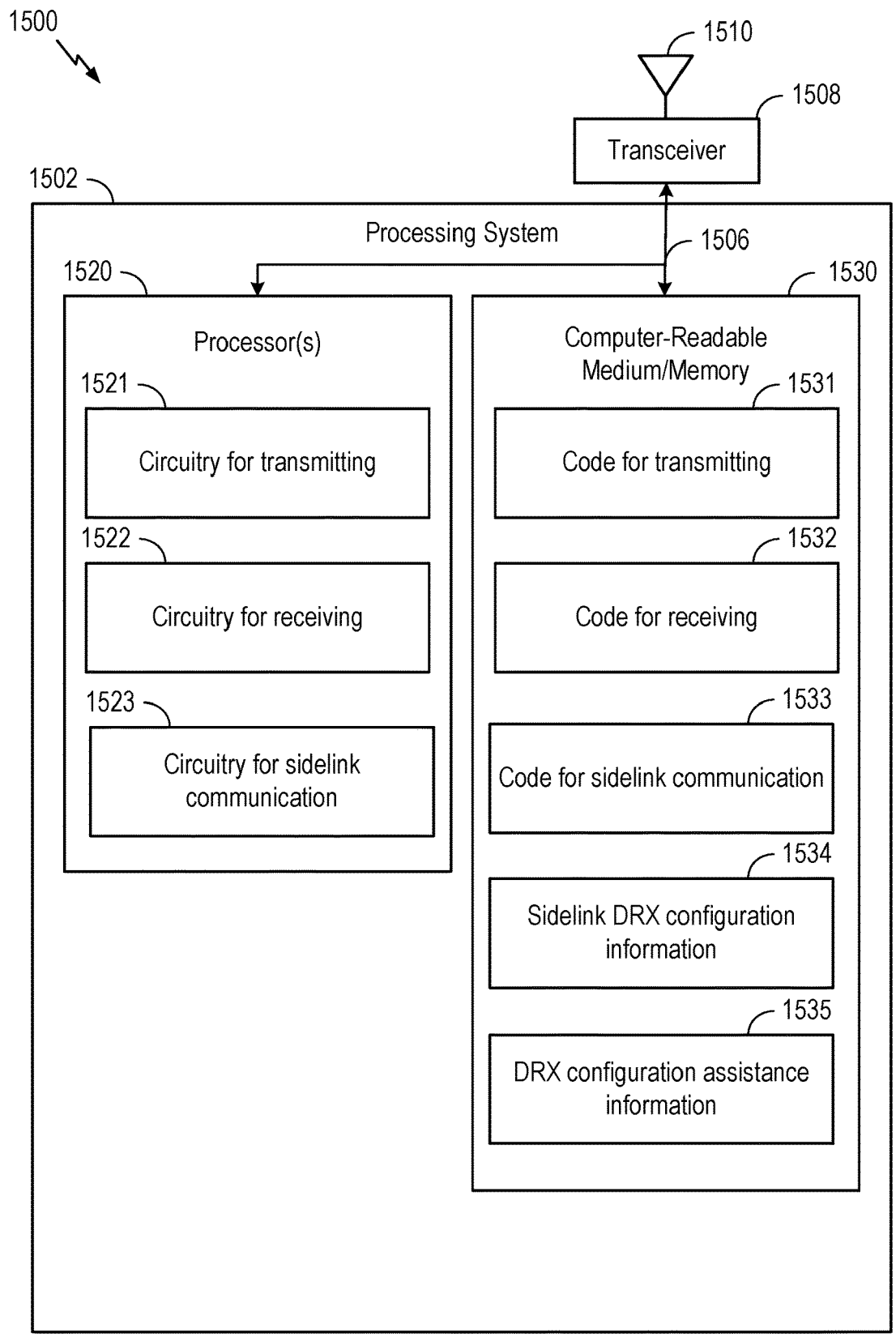
FIG. 15 depicts aspects of an example communication device.

FIG. 15 depicts an example communication device 1500 that includes various components operable, configured, or adapted to perform operations for the techniques disclosed herein, such as the operations depicted and described with respect to FIGS. 7, 9, 10, 12, and 13. In some examples, communication device 1500 may be a base station 102 as described, for example with respect to FIGS. 1 and 2.

Communication device 1500 includes a processing system 1502 coupled to a transceiver 1508 (e.g., a transmitter and/or a receiver). Transceiver 1508 is configured to transmit (or send) and receive signals for the communication device 1500 via an antenna 1510, such as the various signals as described herein. Processing system 1502 may be configured to perform processing functions for communication device 1500, including processing signals received and/or to be transmitted by communication device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 7, 9, 10, 12, and 13, or other operations for performing the various techniques discussed herein for perform operations for sidelink DRX alignment.

In the depicted example, computer-readable medium/memory 1530 stores code 1531 for transmitting and code 1532 for receiving. The computer-readable medium/memory 1530 also stores code for sidelink communication 1533. Further, the computer-readable medium/memory 1530 stores sidelink DRX configuration information 1534 as well as DRX configuration assistance information 1535.

In the depicted example, the one or more processors 1520 include circuitry configured to implement the code stored in the computer-readable medium/memory 1530, including circuitry 1521 for transmitting and code 1522 for receiving. The one or more processors 1520 further include circuitry for sidelink communication 1523.

Various components of communication device 1500 may provide means for performing the methods described herein, including with respect to FIGS. 7, 9, 10, 12, and 13.

In some examples, means for transmitting or sending (or means for outputting for transmission) may include the transceivers 232 and/or antenna(s) 234 of the base station 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station illustrated in FIG. 2 and/or transceiver 1508 and antenna 1510 of the communication device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting (or means for outputting for transmission) may include the transceivers 254 and/or antenna(s0 252 of the UE 104 illustrated in FIG. 2 and/or transceiver 1508 an antenna 1510 of the communication device 1500 in FIG. 15.

Notably, FIG. 15 is an example, and many other examples and configurations of communication device 1500 are possible.

Figure 16:
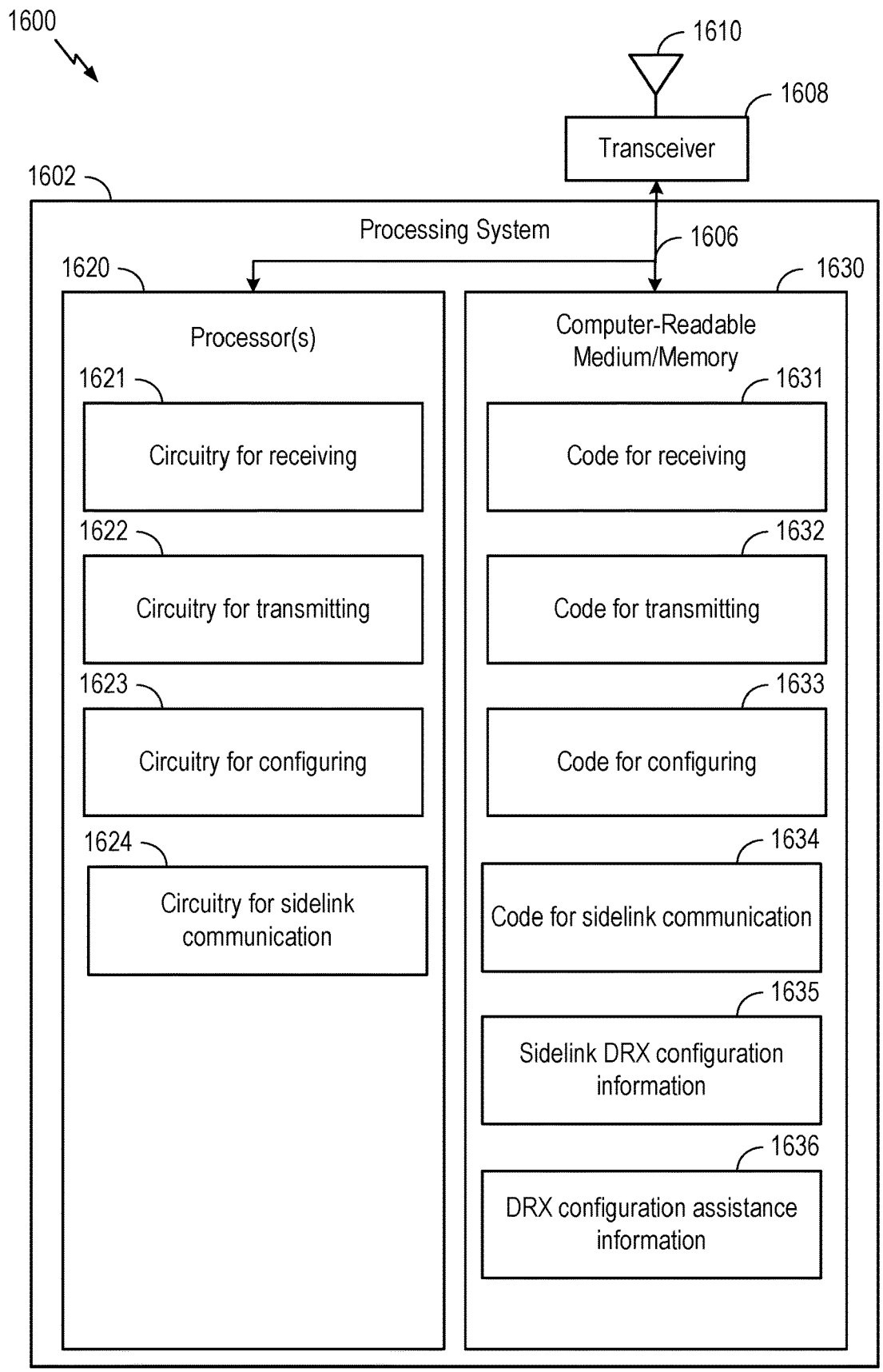
FIG. 16 depicts aspects of another example communication device.

FIG. 16 depicts an example communication device 1600 that includes various components operable, configured, or adapted to perform operations for the techniques disclosed herein, such as the operations depicted and described with respect to FIGS. 7, 8, 10, 11, 13, and 14. In some examples, communication device 1600 may be a user equipment 104 as described, for example with respect to FIGS. 1 and 2.

Communication device 1600 includes a processing system 1602 coupled to a transceiver 1608 (e.g., a transmitter and/or a receiver). Transceiver 1608 is configured to transmit (or send) and receive signals for the communication device 1600 via an antenna 1610, such as the various signals as described herein. Processing system 1602 may be configured to perform processing functions for communication device 1600, including processing signals received and/or to be transmitted by communication device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIGS. 7, 8, 10, 11, 13, and 14, or other operations for performing the various techniques discussed herein for perform operations for sidelink DRX alignment In the depicted example, computer-readable medium/memory 1630 stores code 1631 for receiving, code 1632 for transmitting, and code 1633 for configuring. The computer-readable medium/memory 1630 also stores code for sidelink communication 1634. Further, the computer-readable medium/memory 1530 stores sidelink DRX configuration information 1635 as well as DRX configuration assistance information 1636.

In the depicted example, the one or more processors 1620 include circuitry configured to implement the code stored in the computer-readable medium/memory 1630, including circuitry 1621 for receiving, circuitry 1622 for transmitting, and circuitry 1623 for configuring. The one or more processors 1620 further include circuitry for sidelink communication 1624.

Various components of communication device 1600 may provide means for performing the methods described herein, including with respect to FIGS. 7, 8, 10, 11, 13, and 14.

In some examples, means for transmitting or sending (or means for outputting for transmission) may include the transceivers 254 and/or antenna(s) 252 of the user equipment 104 illustrated in FIG. 2 and/or transceiver 1608 and antenna 1610 of the communication device 1600 in FIG. 16.

In some examples, means for receiving (or means for obtaining) may include the transceivers 254 and/or antenna (s) 252 of the user equipment 104 illustrated in FIG. 2 and/or transceiver 1608 and antenna 1610 of the communication device 1600 in FIG. 16.

In some examples, means for configuring may include various processing system components, such as: the one or more processors 1620 in FIG. 16, or aspects of the user equipment 104 depicted in FIG. 2, including receive processor 258, transmit processor 264, TX MIMO processor 266, and/or controller/processor 280 (including sidelink communication component 281).

Notably, FIG. 16 is an example, and many other examples and configurations of communication device 1600 are possible.

EXAMPLE CLAUSES

Implementation examples are described in the following numbered clauses:

Clause 1: A method, comprising: receiving, from a network at a first user equipment over an air interface, discontinuous reception (DRX) configuration assistance information; transmitting, from the first user equipment to a second user equipment via a sidelink interface, the DRX configuration assistance information; receiving, from the second user equipment at the first user equipment via the sidelink interface, sidelink DRX configuration information, wherein the sidelink DRX configuration information is based on the DRX configuration assistance information; transmitting, from the first user equipment to the network over the air interface, the sidelink DRX configuration information; and receiving, from the network at the first user equipment, modified air interface DRX configuration information for the first user equipment.

Clause 2: The method of Clause 1, further comprising: configuring one or more air interface DRX configuration parameters at the first user equipment based on the modified air interface DRX configuration information; and configuring one or more sidelink DRX configuration parameters at the first user equipment based on the sidelink DRX configuration information, wherein the one or more air interface DRX configuration parameters and the one or more sidelink DRX configuration parameters cause at least one active air interface DRX on period and one active sidelink DRX on period to align in time.

Clause 3: The method of any one of Clauses 1-2, wherein the DRX configuration assistance information comprises one or more of: an initial air interface DRX configuration for the first user equipment; one or more available air interface DRX configurations for the first user equipment; one or more existing sidelink connected mode DRX configurations for one or more other user equipment; or a preferred sidelink connected mode DRX configuration for the first user equipment.

Clause 4: The method of any one of Clauses 1-3, wherein the DRX configuration assistance information is received from the network in a radio resource control (RRC) message.

Clause 5: The method of Clause 4, wherein the RRC message comprises a DownlinkConfigCommonSIB information element comprising the assistance information.

Clause 6: The method of Clause 4, wherein the RRC message comprises a Downlink-PCCH-Config information element comprising the assistance information.

Clause 7: The method of any one of Clauses 1-6, wherein the DRX configuration assistance information is received in a medium access control-control element (MAC-CE) message.

Clause 8: The method of Clause 7, wherein the MAC-CE includes a pointer to a value of a preconfigured set of values for the assistance information.

Clause 9: The method of Clause any one of Clauses 1-8, wherein the modified air interface DRX configuration information comprises one or more of: a default paging cycle parameter value; a paging frame offset parameter value indicating a number of total paging frames; a physical downlink control channel (PDCCH) monitoring occasion parameter value indicating the first PDCCH monitoring occasion for each paging occasion in the paging frame; or a paging occasion parameter value indicating a number of paging occasions in a paging frame.

Clause 10: The method of Clause any one of Clauses 1-9, wherein the sidelink DRX configuration information comprises one or more of: a sidelink DRX start offset parameter value; a sidelink DRX slot offset parameter value; or a sidelink DRX cycle parameter value.

Clause 11: The method of Clause any one of Clauses 1-10, wherein the air interface comprises a Uu interface.

Clause 12: The method of Clause any one of Clauses 1-11, wherein: the first user equipment is in a connected state with respect to the network, and the second user equipment is in an inactive or an idle state with respect to the network.

Clause 13: An apparatus for wireless communication, comprising: a memory comprising executable instructions; and one or more processors configured to execute the executable instructions and cause the apparatus to: receive, from a network at a first user equipment over an air interface, discontinuous reception (DRX) configuration assistance information; transmit, from the first user equipment to a second user equipment via a sidelink interface, the DRX configuration assistance information; receive, from the second user equipment at the first user equipment via the sidelink interface, sidelink DRX configuration information, wherein the sidelink DRX configuration information is based on the DRX configuration assistance information; transmit, from the first user equipment to the network over the air interface, the sidelink DRX configuration information; and receive, from the network at the first user equipment, modified air interface DRX configuration information for the first user equipment.

Clause 14: The apparatus of Clause 13, wherein the one or more processors are further configured to cause the apparatus to: configure one or more air interface DRX configuration parameters at the first user equipment based on the modified air interface DRX configuration information; and configure one or more sidelink DRX configuration parameters at the first user equipment based on the sidelink DRX configuration information, wherein the one or more air interface DRX configuration parameters and the one or more sidelink DRX configuration parameters cause at least one active air interface DRX on period and one active sidelink DRX on period to align in time.

Clause 15: The apparatus of any one of Clauses 1-14, wherein the DRX configuration assistance information comprises one or more of: an initial air interface DRX configuration for the first user equipment; one or more available air interface DRX configurations for the first user equipment; one or more existing sidelink connected mode DRX configurations for one or more other user equipment; or a preferred sidelink connected mode DRX configuration for the first user equipment.

Clause 16: The apparatus of any one of Clauses 1-15, wherein the DRX configuration assistance information is received from the network in a radio resource control (RRC) message.

Clause 17: The apparatus of Clause 16, wherein the RRC message comprises a DownlinkConfigCommonSIB information element comprising the assistance information.

Clause 18: The apparatus of Clause 16, wherein the RRC message comprises a Downlink-PCCH-Config information element comprising the assistance information.

Clause 19: The apparatus of any one of Clauses 1-18, wherein the DRX configuration assistance information is received in a medium access control-control element (MAC-CE) message.

Clause 20: The apparatus of Clause 19, wherein the MAC-CE includes a pointer to a value of a preconfigured set of values for the assistance information.

Clause 21: The apparatus of any one of Clauses 13-20, wherein the modified air interface DRX configuration information comprises one or more of: a default paging cycle parameter value; a paging frame offset parameter value indicating a number of total paging frames; a physical downlink control channel (PDCCH) monitoring occasion parameter value indicating the first PDCCH monitoring occasion for each paging occasion in the paging frame; or a paging occasion parameter value indicating a number of paging occasions in a paging frame.

Clause 22: The apparatus of any one of Clauses 13-21, wherein the sidelink DRX configuration information comprises one or more of: a sidelink DRX start offset parameter value; a sidelink DRX slot offset parameter value; or a sidelink DRX cycle parameter value.

Clause 23: The apparatus of any one of Clauses 13-22, wherein the air interface comprises a Uu interface.

Clause 24: The apparatus of any one of Clauses 13-23, wherein: the first user equipment is in a connected state with respect to the network, and the second user equipment is in an inactive or an idle state with respect to the network.

Clause 25: A non-transitory computer-readable medium for wireless communication, comprising: executable instructions that, when executed by one or more processors of an apparatus, cause the apparatus to: receive, from a network at a first user equipment over an air interface, discontinuous reception (DRX) configuration assistance information; transmit, from the first user equipment to a second user equipment via a sidelink interface, the DRX configuration assistance information; receive, from the second user equipment at the first user equipment via the sidelink interface, sidelink DRX configuration information, wherein the sidelink DRX configuration information is based on the DRX configuration assistance information; transmit, from the first user equipment to the network over the air interface, the sidelink DRX configuration information; and receive, from the network at the first user equipment, modified air interface DRX configuration information for the first user equipment.

Clause 26: The non-transitory computer-readable medium of Clause 25, wherein the executable instructions that, when executed by one or more processors of an apparatus, further cause the apparatus to: configure one or more air interface DRX configuration parameters at the first user equipment based on the modified air interface DRX configuration information; and configure one or more sidelink DRX configuration parameters at the first user equipment based on the sidelink DRX configuration information, wherein the one or more air interface DRX configuration parameters and the one or more sidelink DRX configuration parameters cause at least one active air interface DRX on period and one active sidelink DRX on period to align in time.

Clause 27: A method for wireless communication by a base station (BS), comprising: transmitting, to a first user equipment over an air interface, discontinuous reception (DRX) configuration assistance information; receiving, from the first user equipment over the air interface, a sidelink DRX configuration information; and transmitting, to the first user equipment, modified air interface DRX configuration information for the first user equipment.

Clause 28: The method of Clause 27, wherein the DRX configuration assistance information is transmitted to the first user equipment in a radio resource control (RRC) message.

Clause 29: The method of any one of Clauses 27-28, wherein the DRX configuration assistance information is transmitted in a medium access control-control element (MAC-CE) message.

Clause 30: The method of any one of Clauses 27-29, wherein: the first user equipment is in a connected state with respect to a network, and a second user equipment is in an inactive or an idle state with respect to the network.

Clause 31: A method, comprising: receiving, from a second user equipment at a first user equipment over a sidelink interface, discontinuous reception (DRX) configuration assistance information; transmitting, from the first user equipment to a network via an air interface, the DRX configuration assistance information; receiving, from the network at the first user equipment via the air interface: modified air interface DRX configuration information for the first user equipment; sidelink DRX configuration information for the first user equipment and the second user equipment, wherein the sidelink DRX configuration information is based on the DRX configuration assistance information; and transmitting, from the first user equipment to the second user equipment over the sidelink interface, the sidelink DRX configuration information.

Clause 32: The method of Clause 31, further comprising: configuring one or more air interface DRX configuration parameters at the first user equipment based on the modified air interface DRX configuration information; and configuring one or more sidelink DRX configuration parameters at the first user equipment based on the sidelink DRX configuration information, wherein the one or more air interface DRX configuration parameters and the one or more sidelink DRX configuration parameters cause at least one active air interface DRX on period and one active sidelink DRX on period to align in time.

Clause 33: The method of any one of Clauses 31-32, wherein the DRX configuration assistance information comprises one or more of: an initial air interface DRX configuration for the second user equipment; one or more existing sidelink connected mode DRX configurations for one or more other user equipment; or a preferred sidelink connected mode DRX configuration for the second user equipment.

Clause 34: The method of any one of Clauses 31-33, wherein the sidelink interface comprises a PC5 interface.

Clause 35: The method of any one of Clauses 31-38, wherein the modified air interface DRX configuration information comprises one or more of: a defaultPagingCycle parameter value; a nAndPagingFrameOffset parameter value; a firstPDCCH-MonitoringOccasion-OfPO parameter value; or a ns parameter value.

Clause 36: The method of any one of Clauses 31-35, wherein the sidelink DRX configuration information comprises one or more of: a sl-drx-StartOffset parameter value; a sl-drx-SlotOffset parameter value; or a sl-drx-Cycle parameter value.

Clause 37: The method of any one of Clauses 31-36, wherein the air interface comprises a Uu interface.

Clause 38: The method of any one of Clauses 31-37, wherein: the first user equipment is in a connected state with respect to the network, and the second user equipment is in an inactive or an idle state with respect to the network.

Clause 39: A method for wireless communication by a base station (BS) comprising: receiving, from the first user equipment to a network via an air interface, DRX configuration assistance information; and transmitting, from the network to the first user equipment via the air interface: modified air interface DRX configuration information for the first user equipment; and sidelink DRX configuration information for the first user equipment and a second user equipment, wherein the sidelink DRX configuration information is based on the DRX configuration assistance information.

Clause 40: A method, comprising: transmitting, from a first user equipment to a second user equipment via a sidelink interface, discontinuous reception (DRX) configuration assistance information; and receiving, from the second user equipment at the first user equipment via the sidelink interface, sidelink DRX configuration information, wherein the sidelink DRX configuration information is based on the DRX configuration assistance information.

Clause 41: The method of Clause 40, further comprising: configuring one or more sidelink DRX configuration parameters at the first user equipment based on the sidelink DRX configuration information, wherein the sidelink DRX configuration parameters cause at least one active air interface DRX on period and one active sidelink DRX on period to align in time.

Clause 42: The method of any one of Clauses 40-41, wherein the DRX configuration assistance information comprises one or more of: an initial air interface DRX configuration for the first user equipment; or a preferred sidelink connected mode DRX configuration for the first user equipment.

Clause 43: The method of any one of Clauses 40-42, wherein the sidelink DRX configuration information comprises one or more of: a sl-drx-StartOffset parameter value; a sl-drx-SlotOffset parameter value; or a sl-drx-Cycle parameter value.

Clause 44: The method of any one of Clauses 40-43, wherein: the first user equipment is in an inactive or an idle state with respect to the network, and the second user equipment is in the inactive or the idle state with respect to the network.

Clause 45: The method of any one of Clauses 40-44, further comprising: transmitting, from the first user equipment to a network via a small data transmission, the sidelink DRX configuration information, wherein the first user equipment is in an inactive state.

Clause 46: The method of any one of Clauses 40-45, further comprising: transmitting, from the second user equipment to a network via a first small data transmission, the DRX configuration assistance information, wherein the second user equipment is in an inactive state.

Clause 47: The method of any one of Clauses 40-46, further comprising receiving, from the network using a second small data transmission, the sidelink DRX configuration information.

Clause 48: An apparatus, comprising: a memory comprising executable instructions; one or more processors configured to execute the executable instructions and cause the apparatus to perform a method in accordance with any one of Clauses 1-12 and 27-47.

Clause 51: An apparatus, comprising means for performing a method in accordance with any one of Clauses 1-12 and 27-47.

Clause 52: A non-transitory computer-readable medium comprising executable instructions that, when executed by one or more processors of an apparatus, cause the apparatus to perform a method in accordance with any one of Clauses 1-12 and 27-47.

Clause 53: A computer program product embodied on a computer-readable storage medium comprising code for performing a method in accordance with any one of Clauses 1-12 and 27-47.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/ duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of sidelink discontinuous reception (DRX) alignment in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (e.g., FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, from a second user equipment at a first user equipment over a sidelink interface, discontinuous reception (DRX) configuration assistance information;
   transmitting, from the first user equipment to a network via an air interface, the DRX configuration assistance information, wherein the first user equipment relays communication between the second user equipment in a Radio Resource Control (RRC) inactive or idle state and the network via the sidelink interface with the second user equipment and the air interface with the network;
   receiving, from the network at the first user equipment via the air interface:
      modified air interface DRX configuration information for the first user equipment received from the network, and
      sidelink DRX configuration information for the first user equipment and the second user equipment, wherein the sidelink DRX configuration information is based on the DRX configuration assistance information; and
   transmitting, from the first user equipment to the second user equipment over the sidelink interface, the sidelink DRX configuration information.

2. The method of claim 1, further comprising:
   configuring one or more air interface DRX configuration parameters at the first user equipment based on the modified air interface DRX configuration information; and
   configuring one or more sidelink DRX configuration parameters at the first user equipment based on the sidelink DRX configuration information,
   wherein the one or more air interface DRX configuration parameters and the one or more sidelink DRX configuration parameters cause at least one active air interface DRX on period and one active sidelink DRX on period to align in time.

3. The method of claim 1, wherein the DRX configuration assistance information comprises one or more of:
   an initial air interface DRX configuration for the second user equipment;
   one or more existing sidelink connected mode DRX configurations for one or more other user equipment; or
   a preferred sidelink connected mode DRX configuration for the second user equipment.

4. The method of claim 1, wherein the sidelink interface comprises a PC5 interface.

5. The method of claim 1, wherein the modified air interface DRX configuration information comprises one or more of:
   a defaultPagingCycle parameter value;
   a nAndPagingFrameOffset parameter value;
   a firstPDCCH-MonitoringOccasionOfPO parameter value; or
   a ns parameter value.

6. The method of claim 1, wherein the sidelink DRX configuration information comprises one or more of:
   a sl-drx-StartOffset parameter value;
   a sl-drx-SlotOffset parameter value; or
   a sl-drx-Cycle parameter value.

7. The method of claim 1, wherein the air interface comprises a Uu interface.

8. The method of claim 1, wherein:
   the first user equipment is in a connected state with respect to the network, and
   the second user equipment is in an inactive or an idle state with respect to the network.

9. An apparatus for wireless communication, comprising:
   one or more memories comprising executable instructions; and
   one or more processors configured to execute the executable instructions and cause the apparatus to:
      receive, from a second user equipment at a first user equipment over a sidelink interface, discontinuous reception (DRX) configuration assistance information;
      transmit, from the first user equipment to a network via an air interface, the DRX configuration assistance information, wherein the first user equipment is configured to relay communication between the second user equipment in a Radio Resource Control (RRC) inactive or idle state and the network via the sidelink interface with the second user equipment and the air interface with the network;
      receive, from the network at the first user equipment via the air interface:
         modified air interface DRX configuration information for the first user equipment received from the network, and
         sidelink DRX configuration information for the first user equipment and the second user equipment, wherein the sidelink DRX configuration information is based on the DRX configuration assistance information; and
      transmit, from the first user equipment to the second user equipment over the sidelink interface, the sidelink DRX configuration information.

10. The apparatus of claim 9, wherein the one or more processors are further configured to cause the apparatus to:
    configure one or more air interface DRX configuration parameters at the first user equipment based on the modified air interface DRX configuration information; and
    configure one or more sidelink DRX configuration parameters at the first user equipment based on the sidelink DRX configuration information,
    wherein the one or more air interface DRX configuration parameters and the one or more sidelink DRX configuration parameters cause at least one active air interface DRX on period and one active sidelink DRX on period to align in time.

11. The apparatus of claim 9, wherein the DRX configuration assistance information comprises one or more of:

an initial air interface DRX configuration for the second user equipment;
one or more existing sidelink connected mode DRX configurations for one or more other user equipment; or
a preferred sidelink connected mode DRX configuration for the second user equipment.

12. The apparatus of claim 9, wherein the sidelink interface comprises a PC5 interface.

13. The apparatus of claim 9, wherein the modified air interface DRX configuration information comprises one or more of:
a defaultPagingCycle parameter value;
a nAndPagingFrameOffset parameter value;
a firstPDCCH-MonitoringOccasionOfPO parameter value; or
a ns parameter value.

14. The apparatus of claim 9, wherein the sidelink DRX configuration information comprises one or more of:
a sl-drx-StartOffset parameter value;
a sl-drx-SlotOffset parameter value; or
a sl-drx-Cycle parameter value.

15. The apparatus of claim 9, wherein the air interface comprises a Uu interface.

16. The apparatus of claim 9, wherein:
the first user equipment is in a connected state with respect to the network, and
the second user equipment is in an inactive or an idle state with respect to the network.

17. A non-transitory computer-readable medium for wireless communication, comprising:
executable instructions that, when executed by one or more processors of a first user equipment, cause the first user equipment to:
receive, from a second user equipment at the first user equipment over a sidelink interface, discontinuous reception (DRX) configuration assistance information;
transmit, from the first user equipment to a network via an air interface, the DRX configuration assistance information, wherein the first user equipment is configured to relay communication between the second user equipment in a Radio Resource Control (RRC) inactive or idle state and the network via the sidelink interface with the second user equipment and the air interface with the network;
receive, from the network at the first user equipment via the air interface:
modified air interface DRX configuration information for the first user equipment received from the network, and
sidelink DRX configuration information for the first user equipment and the second user equipment, wherein the sidelink DRX configuration information is based on the DRX configuration assistance information; and
transmit, from the first user equipment to the second user equipment over the sidelink interface, the sidelink DRX configuration information.

18. The non-transitory computer-readable medium of claim 17, wherein the executable instructions that, when executed by the one or more processors of the first user equipment, further cause the first user equipment to:
configure one or more air interface DRX configuration parameters at the first user equipment based on the modified air interface DRX configuration information; and
configure one or more sidelink DRX configuration parameters at the first user equipment based on the sidelink DRX configuration information,
wherein the one or more air interface DRX configuration parameters and the one or more sidelink DRX configuration parameters cause at least one active air interface DRX on period and one active sidelink DRX on period to align in time.

19. The non-transitory computer-readable medium of claim 17, wherein the DRX configuration assistance information comprises one or more of:
an initial air interface DRX configuration for the second user equipment;
one or more existing sidelink connected mode DRX configurations for one or more other user equipment; or
a preferred sidelink connected mode DRX configuration for the second user equipment.

20. The non-transitory computer-readable medium of claim 17, wherein the sidelink interface comprises a PC5 interface.

* * * * *